(12) United States Patent
Zhang et al.

(10) Patent No.: US 8,278,587 B2
(45) Date of Patent: Oct. 2, 2012

(54) SYSTEMS AND METHODS TO MODIFY GAS METAL ARC WELDING AND ITS VARIANTS

(75) Inventors: YuMing Zhang, Nicholasville, KY (US); Jinsong Chen, Lexington, KY (US)

(73) Assignee: Adaptive Intelligent Systems, LLC

( * ) Notice: Subject to any disclaimer, the term of this patent is extended or adjusted under 35 U.S.C. 154(b) by 342 days.

(21) Appl. No.: 12/661,433

(22) Filed: Mar. 17, 2010

(65) Prior Publication Data

US 2010/0301030 A1    Dec. 2, 2010

Related U.S. Application Data

(63) Continuation-in-part of application No. 12/028,958, filed on Feb. 11, 2008.

(51) Int. Cl.
*B23K 9/02* (2006.01)

(52) U.S. Cl. ......... 219/121.45; 219/121.52; 219/121.63; 219/136; 219/137 PS; 219/137 WM

(58) Field of Classification Search ............. 219/121.45, 219/121.52, 121.63, 136, 137 PS, 137 WM
See application file for complete search history.

(56) References Cited

U.S. PATENT DOCUMENTS 7,297,900 B2 * 11/2007 Byerly ...................... 219/137 R

OTHER PUBLICATIONS

Xiaopei Liu; Dual Bypass Gas Metal Arc Welding Process and Control; Deparment of Electrical and Computer Engineering, University of Kentucky;Oct. 17, 2008.*

* cited by examiner

*Primary Examiner* — Long Tran
(74) *Attorney, Agent, or Firm* — Stockwell & Smedley, PSC

(57) ABSTRACT

A welding system and method includes a main torch including a main electrode configured to form a first arc with a base metal; a first bypass torch including a first bypass electrode configured to form a second arc with the main electrode; and a second bypass torch including a second bypass electrode configured to form a third arc with the main electrode.

30 Claims, 16 Drawing Sheets

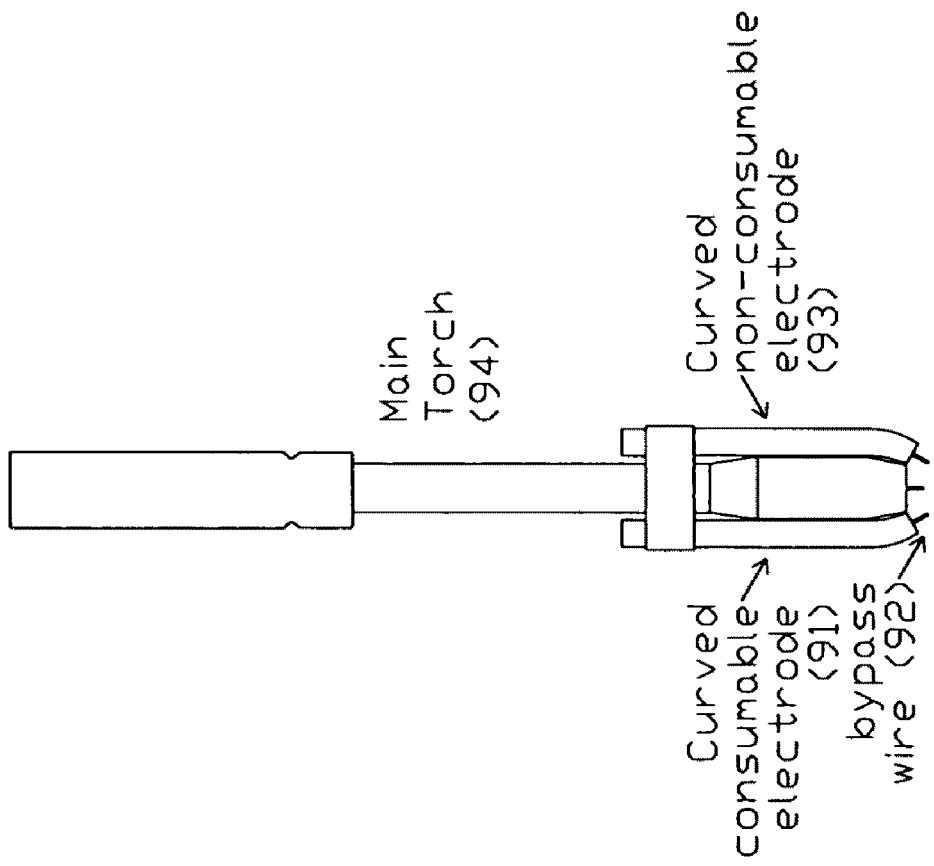

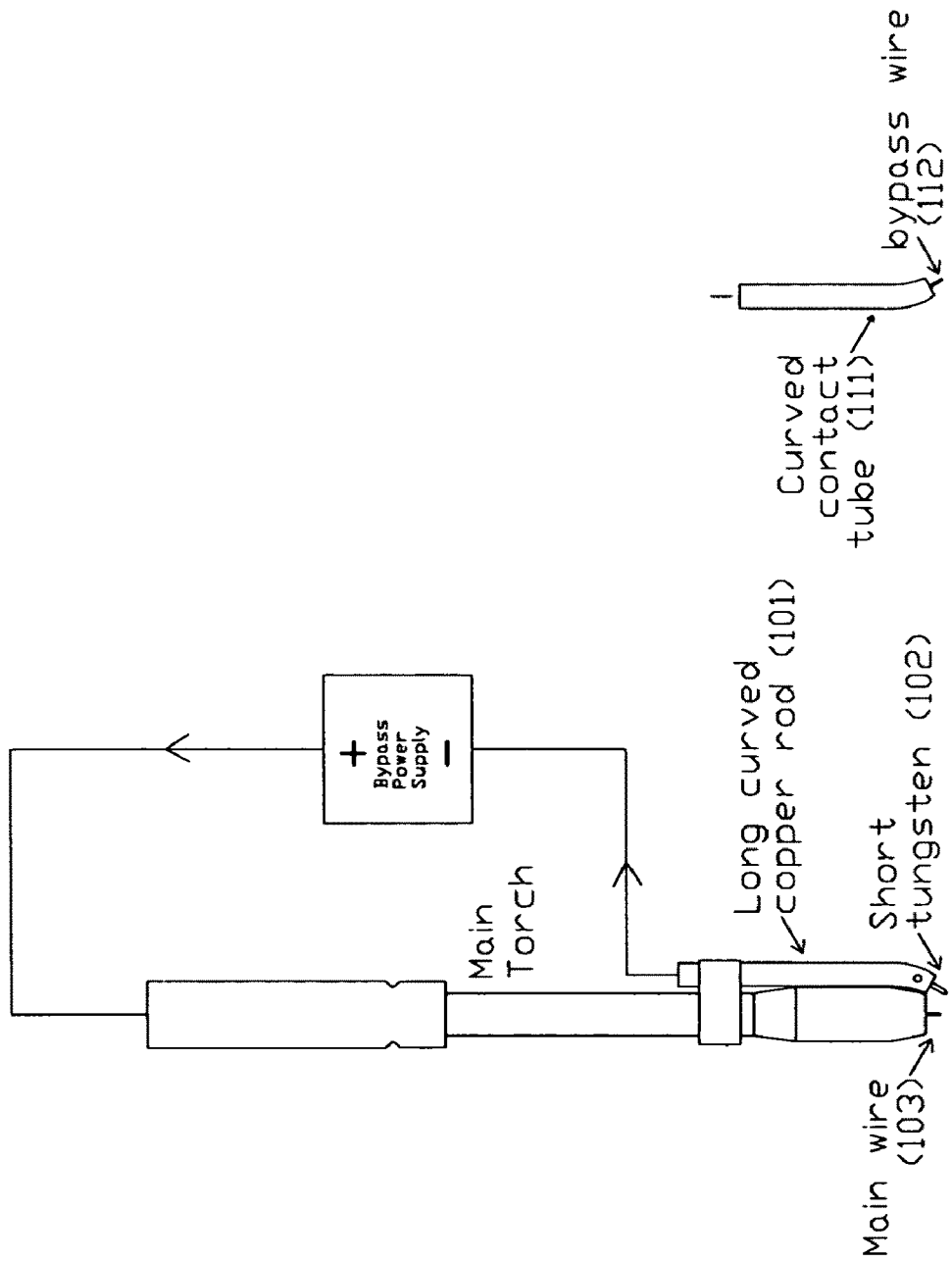

SYSTEMS AND METHODS TO MODIFY GAS METAL ARC WELDING AND ITS VARIANTS

RELATED APPLICATIONS

The present application is a Continuation-In-Part, and claims priority to U.S. patent application Ser. No. 12/028,958, filed Feb. 11, 2008, the contents of which are incorporated by reference in their entirety. The present application claims priority to Provisional Patent Application No. 61/260,382 filed Nov. 11, 2009, the contents of which are incorporated by reference in their entirety.

STATEMENT REGARDING FEDERALLY SPONSORED RESEARCH OR DEVELOPMENT

The present invention was made with government support under contract numbers N65538-08-M-0049 and N00024-09-C-4140 awarded by the Department of the Navy. The government has certain rights in the invention.

Government support also includes matching funds from the Commonwealth of Kentucky (KSTC-184-512-08-038 and KSTC-184-512-09-067).

FIELD

This invention relates to arc welding, and more particularly to gas metal arc welding and its variants.

BACKGROUND

Welding is the last operation during fabrication of many high value added products. Manufacturers of such products need welding processes/technologies to join metals with acceptable quality at as low as possible costs in order to be competitive. To this end, gas metal arc welding (GMAW) and its variants such as submerged arc welding (SAW) and flux cored arc welding (FCAW) have become the most widely used processes for mechanized and automated joining of metals especially in heavy industry where the cost of welding is critical. They are selected over other possible processes for joining metals such as gas tungsten arc welding (GTAW), laser and electron beam welding, friction welding, resistive welding, etc. because they are cost effective for vast majority of applications in terms of fast melting of filler metal, easy operation and maintenance, relatively low requirement on joint preparation and working conditions, applicability for many joint designs, relatively low requirement on labor skills, tolerance on process variations, robustness and consistence in weld quality, relatively low equipment and capital investment, etc.

Despite the overall advantage of GMAW and its variants over other processes, there are areas where modifications are needed to further reduce costs. For many applications, the welding time may need to be as small as possible in order to reduce the overall production cycle. First, modifications are needed for GMAW and its variants to further improve the welding productivity by further increasing the welding speed and reducing the number of passes. To this end, the wire needs to be melted at as high as possible speed. Second, for conventional GMAW and its variants which melt wires by the arc established between the wire and work-piece, the arc also heats the work-piece in addition to the wire. The arc heat which directly heats the work-piece, referred to as excessive heat hereinafter, is proportional to the arc heat which melts the wire, referred to as effective heat hereinafter. While the effective heat is always desirable for melting the wire, the excessive heat needs to be controlled at desirable level to achieve desirable level of fusion and control the material properties of the resultant welds; the excessive heat input accumulated over all passes, referred to as accumulative excessive heat input hereinafter, is desired to be as low as possible to control the distortion which is generally considered to increase as the accumulative heat input. Hence, modifications are also needed to control the excessive heat input at desired level and reduce the accumulative excessive heat input as much as permitted.

What are desired are methods to modify the GMAW and its variants such that the modified process can reduce the accumulative heat input and distortion; control the heat input at the level in a particular pass to produce acceptable materials properties; increase the melting speed with only minimal excessive heat input increase; and be incorporated easily with existing GMAW equipment/investment because of the massive use of GMAW and its variants.

Before a solution can be discussed, some problems in GMAW and its variants need to be analyzed. In conventional GMAW shown in FIG. 1, an arc 11 is established between the wire 12 and base metal 13 and the current 14 which heats the wire is exactly the same as the current 15 which heats the base metal (like in all conventional arc welding processes). This fundamental characteristic of conventional arc welding produces unwanted side-effects to all arc welding processes including the GMAW and its variants.

First, in GMAW and its variants, the wire 12 is primarily melted by the anode heat $IV_{anode}$ but the cathode heat $IV_{cathode}$ is imposed totally on the base metal 13 (workpiece). The effective and excessive heat in conventional GMAW are thus $IV_{anode}$ and $IV_{cathode}$ respectively. Because $V_{cathode}$ is greater than $V_{anode}$ in GMAW and its variants, $IV_{cathode} > IV_{anode}$. Moreover, the excessive heat $IV_{cathode}$ proportionally increases with the effective heat $IV_{anode}$ and increasing the current to increase the effective heat for melting the wire 12 faster will proportionally increase the excessive heat contributing to enlarging the weld pool 16, degrading the materials properties of the weld and the heat-affected zone (HAZ).

Second, the arc pressure is given as $$P_{arc} = \frac{\mu_0 IJ}{4\pi}$$

where $\mu_0$ is permeability in vacuum space, I is the welding current, J is the current density. It is understood that the current density follows a Gaussian distribution $$J(r) = \frac{I}{2\pi\sigma_j^2}\exp\left(-\frac{r^2}{2\sigma_j^2}\right)$$

where $\sigma_j$ is current distribution parameter and $r=\sqrt{x^2+y^2}$. As a result, the arc pressure can be expressed as $$P_{arc} = \frac{\mu_0 I^2}{8\pi^2\sigma_j^2}\exp\left(-\frac{r^2}{2\sigma_j^2}\right).$$

The maximum pressure is $$P_{arc,max} = \frac{\mu_0 I^2}{8\pi^2 \sigma_j^2}.$$

As the cathode of the arc, the weld pool 16 on the base metal 13 is always subject to an arc pressure proportional to the square of the current. This suggests that in addition to increasing the weld pool 16, increasing the current 14 also increases the arc pressure rapidly. Using a large current to increase the melting speed or deposition rate therefore also increases the risk to burn-through the base metal 13, generate undercuts, and blow liquid metal away from the weld pool 16.

Conventional GMAW and its variants do not have the capabilities to reduce the accumulative heat input and distortion because (1) the needed accumulative effective heat is determined by the weld size or the metal which needs to be melted which are both fixed for a given application; (2) the accumulative excessive heat is proportional to the accumulative effective heat in GMAW and its variants and is also fixed; (3) the sum of the accumulative effective heat and excessive heat is thus also fixed and the accumulative heat input is thus fixed. It is possible to control the heat input at the level in a particular pass to produce acceptable materials properties but the side effect is that the deposition rate will be fixed because (1) the heat input consists of the effective and excessive heat; (2) when the heat input is fixed, the effective heat is also fixed because the excessive heat and effective maintains a fixed proportion; (3) when the effective heat is fixed, the melting speed of the wire 12 is also fixed. As a result, controlling the heat input at a desired level (typically relatively low) would result in a low deposition rate each pass and the needed number of passes would be large resulting in a low productivity. It is not possible to increase the melting speed without or only with minimal excessive heat input increase because (1) the melting speed is approximately proportional to the effective heat and (2) the excessive heat input is proportional to the effective heat. In short, increasing the melting speed will proportionally increase the excessive heat. Finally, increasing melting speed will increase the current 14 and the arc pressure will increase rapidly causing additional problems.

It can be easily appreciated that the fundamental characteristic of the GMAW and its variants, (i.e., the melting current 14 which determines the effective heat and melting speed equals the base metal current 15 which determines the excessive heat and arc pressure) is a significant reason for the root of the problems listed above. Modifications need to be taken to differentiate those two currents but the modifications should be easily incorporated with existing GMAW and its variants' equipment/investment because of the massive use of GMAW and its variants in addition to being cost effective.

It should be pointed out that several other technologies have been developed to modify GMAW process from different aspects. Among these technologies, two have received attention: tandem GMAW and Variable-Polarity GMAW (VP-GMAW). In Tandem GMAW, two torches have been integrated into one bigger torch, and two close parallel arcs are adjusted by two GMAW power supplies independently. In essence, Tandem GMAW is still considered two parallel GMAW processes, but it can alternate the maximum welding current to each torch. As a result, the arc pressure remains unchanged, and the wire feed speed can be doubled. Hence, if arc pressure is the major concern, Tandem GMAW can double the deposition rate. However, this modification does not reduce the heat input. The ratio between the excessive heat and effective heat remains unchanged from the conventional GMAW. For VP-GMAW, liquid droplets are still detached during the reverse polarity (wire positive) period, but the welding wire can be melted faster during the straight polarity (wire negative) period. It was found that to melt the welding wire at the same rate, the base metal heat input could be "up to 47 percent less" than the conventional pulsed GMAW. The principle is that in conventional GMAW, it is always true that the effective heat is $V_{anode}I$ and the excessive heat is $V_{cathode}I$; however, in VP-GMAW, $V_{anode}I$ and $V_{cathode}I$ alternate its role as the effective and excessive heat. Because $V_{cathode}I > V_{anode}I$, this alternation reduces the excessive heat input and increases the effective heat. However, because the current is the same for the generation of the effective heat and excessive heat, it does not appear to be a process which can freely control them to reduce the excessive heat as much as desired.

SUMMARY

A welding system and method includes a main torch including a main electrode configured to form a first arc with a base metal; a first bypass torch including a first bypass electrode configured to form a second arc with the main electrode; and a second bypass torch including a second bypass electrode configured to form a third arc with the main electrode.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

FIG. 9 is the schematic of an example using curved contact tubes and/or curved non-consumable electrodes to improve the accessibility of the torch set in accordance with the principles of the present invention.

FIG. 10 is the schematic representation of a specific design of curved non-consumable electrodes in accordance with the principles of the present invention.

FIG. 11 is the design of a curved consumable bypass contact tube in accordance with the principles of the present invention.

DETAILED DESCRIPTION OF THE PREFERRED EMBODIMENTS

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Regardless of the benefits of the welding systems previously described, no existing technologies or other modifications to GMAW and its variants have the following capabilities at the same time: (1) the capability to reduce the accumulative heat input and reduce the distortion through reducing the accumulative heat input; (2) the capability to control the heat input at the level in a particular pass to produce acceptable materials properties; (3) the capability to increase the melting speed without and only with minimal excessive heat input increase; and (4) the capability to be incorporated easily with existing GMAW equipment/investment without replacing the existing equipment. While current DE-GMAW techniques and modification come closest to providing all these needed capabilities, improvements to achieve high welding deposition and productivity remain desirable benefits to be achieved by embodiments of the present invention.

Figure 1:
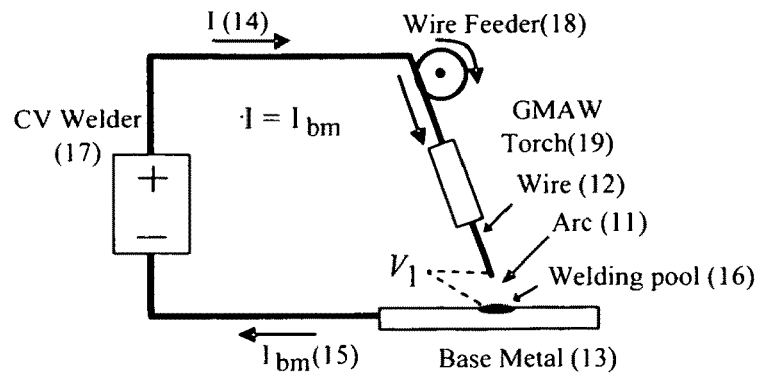
FIG. 1 is a schematic representation of prior art GMAW.

As discussed previously FIG. 1 illustrates a conventional, prior art GMAW system. In particular, the system includes a GMAW torch that is in communication with a wire feeder 18 and a constant voltage (CV) power supply 17. The power supply 17 provides a current to the torch 19, so that the wire 12 being fed from the wire feeder 18 may function as a consumable electrode as it is directed to a base metal 13 to be welded. In this configuration, a current 14 is provided to the wire 12. When the wire 12 completes the welding "circuit" (e.g., during the process of welding), the current 14 flows through the base metal 13. Due to the arrangement of this circuit, the melting current 14 is equal to the base metal current 15. Accordingly, an increase in the melting current 14 results in an equivalent increase in the base metal current 15 through the base metal 13. A user desiring to increase the welding speed (e.g., the melting speed of the wire 12 and deposition of the same) by increasing the melting current 14, simultaneously increases the base metal current 15 through the base metal 13. This increase in current through the base metal 13 increases heat and distortion of the base metal 13. Hence, the user must compromise between the speed of the welding, quality of the weld, and the heat and distortion to the base metal 13.

Figure 2:
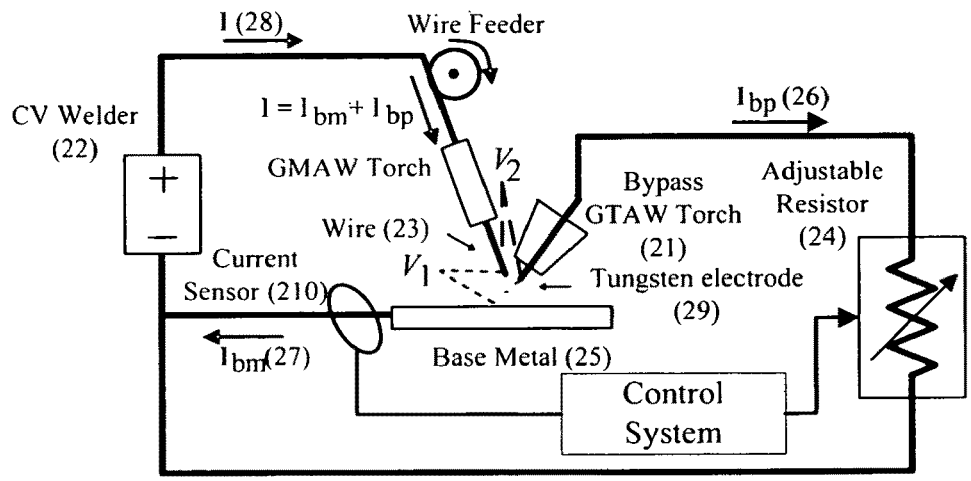
FIG. 2 is a schematic representation of a related non-consumable DE-GMAW.
Figure 3:
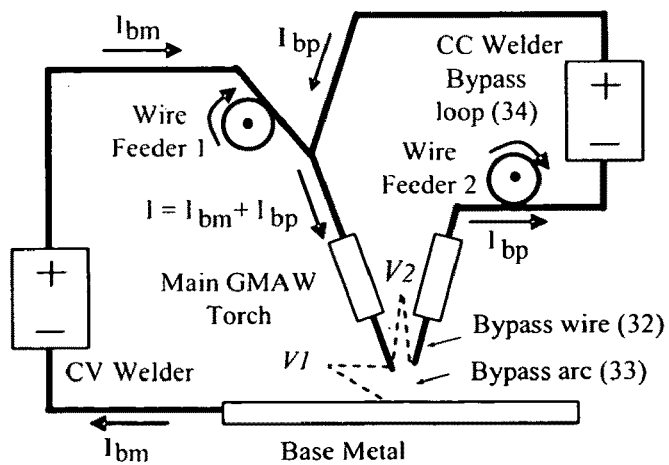
FIG. 3 is a schematic representation of a related consumable DE-GMAW.

To overcome some of the limitations of conventional welding systems, an arc welder and related system for welding has been previously disclosed (US Patent Application Publication No. 20080190900). As noted, the present application claims priority to and incorporates by reference this previous patent application. In its most general form, it includes two electrodes for use in and control of the welding process. The welder and system enable increased welding productivity while allowing the current input in a base metal being welded to be independently controlled. Specifically, the welder and system allow for the decoupling of the current used to melt the welding wire from the current through the base metal being welded. This allows for a user to increase the melting current for the welding wire, which increases the deposition rate of the melted welding wire, without increasing the current to the base metal. Accordingly, the base metal current may be controlled at certain levels, while the current used to melt the welding wire is increased. FIG. 2 and FIG. 3 show two examples of such a system.

Thus, referring to FIG. 2 and FIG. 3, a double-electrode gas metal arc welding (DE-GMAW) has been proposed as a possible modification to conventional GMAW process and its variants which differentiates the two currents 14, 15 in a way which can be easily incorporated into existing GMAW equipment/investment at a low cost. It differentiates the base metal current 27 from the melting current 28 by adding a bypass torch 21 and bypassing part of melting current 28 through the bypass torch 21. Two versions of DE-GMAW process have been proposed as adaptations of existing GMAW system consisting of a constant voltage (CV) power supply 17, a wire feeder 18, and a GMAW torch 19.

One version is shown in FIG. 2 where a GTAW torch 21 is added as the bypass torch. The current supplied by the power source 22 is broken into two branches at the end (tip) of the wire 23 one into the bypass torch then to the resistor R 24 toward the negative terminal of the power source 22, another into the base metal 25 toward the negative terminal of the power supply 22. They are referred to as the bypass current $I_{bp}$ 26 and base metal current $I_{bm}$ 27, respectively. It can be seen, while in conventional GMAW there is no bypass channel so that $I_{bp}$=0 and $I_{bm}$=I is all the current supplied by the power source 22, in DE-GMAW $I_{bm}$ 27 in general is smaller than the current I 28 which melts the wire 23. In this case, the effective heat is $V_{anode}I$ and the excessive heat is $V_{cathode}I_{bm}$. It has been found, when the resistance R 24 of the adjustable resistor is zero, the majority of the current 28 supplied by the power source 22 flows through the bypass torch 21 so that $I_{bp}$ 26 is large and $I_{bm}$ 26 is small. One explanation is that the tungsten electrode 29 of the bypass torch 21 is much easier than the base metal 23 to emit electrons. By adjusting the resistance of the adjustable resistor 24, the distribution of the current I 28 among $I_{bm}$ 27 and $I_{bp}$ 26 and the excessive heat $V_{cathode}I_{bm}$ can be freely changed and feedback controlled using a current sensor 210 to monitor the base metal current $I_{bm}$ 27. In previous operations using this process, for example, approximately 370 A of current can be supplied to melt the wire and make a lap joint on 2 mm thick sheet metal with the wire feed speed approximately 550 inch per minute and a diameter of the wire of about 1.2 mm. As a result, sufficient metal was deposited at a high welding speed of 1.5 meter per minute. The base metal heat input was controlled at the needed level by controlling the base metal current 27 at 200 A approximately. However, after the process was switched to conventional GMAW, all 370 A of current was imposed on the base metal 25. The excessive heat increased from 200$V_{cathode}$ to 370$V_{cathode}$ and the base metal 25 was thus burnt through. This version of DE-GMAW has been referred to as non-consumable DE-GMAW. It has also been proposed that two GTAW torches are added to provide two bypass channels and it has been named dual-bypass GMAW. This modification should still be a non-consumable DE-GMAW.

Another modification that has been proposed includes adding a second GMAW torch 31 to an existing GMAW system as shown in FIG. 3. The GMAW torch 31 is used to replace the GTAW torch because the energy absorbed by the tungsten electrode 29 is eventually wasted in the cooling water. By replacing the non-consumable tungsten (GTAW torch) 21 with a consumable wire (GMAW torch) 31, this part of energy becomes effective heat to melt the bypass wire 32, rather than to be wasted. As a result, the melting speed is increased. However, the bypass arc 33 is beneficially controlled in order to be stable. This version of modification has been referred to as consumable DE-GMAW process and an additional constant current (CV) power supply has been added to power the added bypass channel 34.

Whereas the non-consumable DE-GMAW turns part of the excessive heat from being harmful to being wasted, the consumable DE-GMAW changes it into part of the effective heat. In both versions, the excessive heat is $V_{cathode}I_{bm}$ and can be controlled by controlling the base metal current $I_{bm}$ at the desired level needed for sufficient fusion. The effective heat is $V_{anode}(I_{bm}+I_{bp})$ in non-consumable DE-GMAW and $V_{anode}(I_{bm}+I_{bp})+V_{cathode}I_{bp}$ in consumable DE-GMAW, and it can be controlled in both cases by changing $I_{bp}$ after $I_{bm}$ has been determined based on the control on the excessive heat. Hence, the excessive heat and effective heat can be separately controlled for both cases.

However, the existing DE-GMAW systems shown in FIG. 2 and FIG. 3 have some drawbacks such as: (1) the original system is limited to GMAW; (2) the accessibility is affected by the addition of the bypass torch and the way in which the bypass torch is added; (3) use of bypass torches and water cooling restrict the practicability of using multiple bypass channels to further increase the speed and welding/cladding productivity; (4) use of one main power supply and main wire restricts the further increase in speed and welding/cladding productivity; (5) use of single bypass channel method (either consumable or non-consumable) can restrict the capability to either further improve the productivity in certain degree with relatively high process stability, current distribution control range and liquid metal detaching process controllability with non-consumable bypass channel or to improve the productivity significantly but with less controllability of the process stability, relatively limited current distribution range, and less controllability on the liquid metal detaching process; (6) an additional power supply has to be added to the consumable bypass channel and the type of the additional power supply is constant voltage (CC) while the end users may prefer a CV power supply; (7) the power resistors used to control the bypass current in non-consumable DE-GMAW with an additional power supply for the bypass channel consume and waste energy; (8) the torch set is not weaved when traveling along the weld seam and the controllability on the weld bead geometry is weak and strongly coupled with the base metal heat input. These issues can affect the use of the bypass method for higher productivity, for being used in other widely used processes such as SAW and FCAW, for better, more effective, and simpler process control and equipment without adding additional power supplies, without wasting significant amount of energy, and without the need and complexity for adding additional power supplies, for use in applications where the deposition speed, deposition bead geometry, and base metal melting minimization and control are key concerns such as very high speed and cladding.

To overcome some of issues identified above, an improved system, referred to as the Extended Metal Arc Welding System, its various embodiments, its various control implementation methods, and its possible application methods are described herein. In its most general form, the system is formed by attaching bypass channels to one or multiple parallel metal arc systems (referred to as "base systems" hereafter) including all processes where a consumable is melted by an arc established on it as either a cathode or an anode including but not limited to the conventional gas metal arc welding (GMAW), flux cored arc welding (FCAW), submerged arc welding (SAW). The parallel base systems may be arranged in different ways such as the axes of their consumables remain parallel with appropriate distances or they form certain angles. The system may have one or multiple bypass channels while each bypass channel may be powered by its own power supply or by one of the power supplies in the base systems. Further, the system may use one or simultaneously two of the existing bypass methods (consumable wire and non-consumable electrodes). Its realization can be formed using any number of base systems, any combination of different types of base systems, any number of bypass channels or any combinations of the bypass methods.

In its most general form, each particular extended metal arc welding system may have one or multiple, and different kinds, of bypass channels in order to increase the productivity and improve the process stability at the same time. Attaching multiple consumable or non-consumable bypass electrodes to the torch of a base system is important in embodiments of the present invention as are innovative bypass electrode designs. Thus, innovative designs of consumable and non-consumable bypass electrodes to facilitate the attachment of multiple consumable and non-consumable bypass electrodes to a conventional torch in a base system are herein disclosed, as well.

In its most general form, the entire control system has two major types of elements and three major types of variables. The two major types of elements include: (1) the extended system to be controlled which includes the appropriately arranged base systems and the appropriate arranged bypass channels and their components; and (2) the control system, which includes the control algorithm and its implementation hardware and program, sensors and their processing software, and human-machine interface, that controls the extended system. The three major types of variables include (1) the desired objective parameters the extended system is supposed to output; (2) process conditional parameters that describe the given environment and application; and (3) control variables that are adjusted by the control system and are sent as inputs to the extended system. The control variables also include output variables that describe how the system actually processes the material. The objective of the control system is to use the control algorithm to determine how to adjust the control variables such that the output variables approach their desired values as set through the desired objective parameters. For different realizations, the control system and control will take particular and appropriate forms.

When a particular extended metal arc welding system is formed by attaching selected/arranged bypass channels and associated components to selected/arranged base systems, the system may or may not have been formed with a sufficient or effective ways to adjust its output variables for some reasons. If it has been formed with sufficient and effective ways to adjust its outputs variables, the input parameters which are used to change the output variables will be identified. Alternatively, if without sufficient and effective ways to adjust output variables, additional hardware/devices may be added to introduce new input parameters. This control/implementation method is adaptable based on particular extended metal arc welding systems.

For different applications, the requirements may be different and the extended system may be realized and controlled in particular preferred ways to meet specific requirements. The requirements on the extended metal arc welding system and their realizations and control implementation methods to meet these requirements for different welding and cladding application are described in more detail below. For example, the total heat input and excessive heat input can be conveniently controlled to control the distortion and weld penetration by adjusting the feed speeds of main and bypass wires using a CV power supply as the bypass channel power supply or by adjusting the electronic switch in the bypass channel without adjusting the travel speed.

Figure 4:
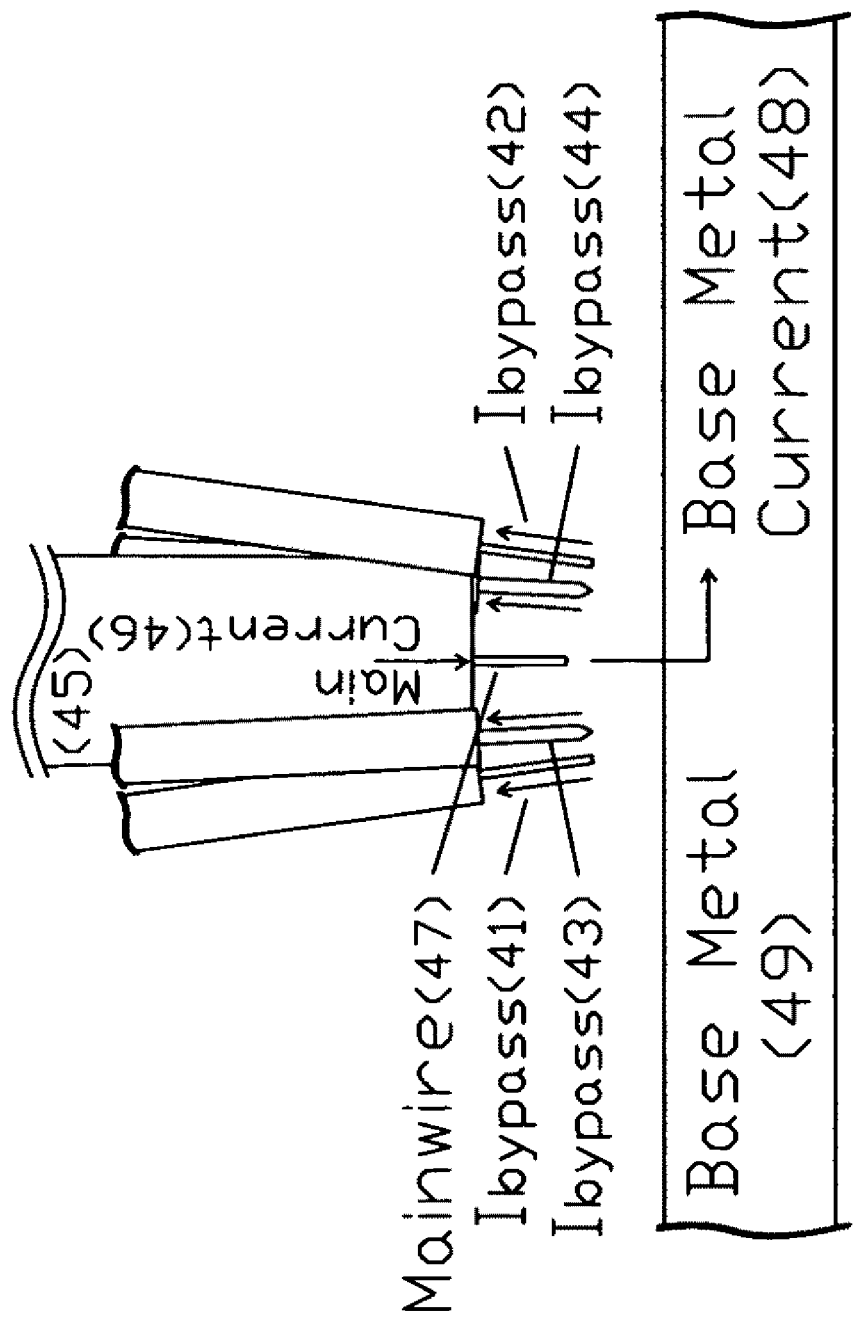
FIG. 4 is a schematic representation of extended metal arc welding system which includes non-consumable DE-GMAW and consumable DE-GMAW in accordance with the principles of the present invention.

Beginning with one embodiment shown in FIG. 4, the number of the bypass channels increases from one (either consumable or non-consumable) in the prior art shown in FIG. 2 and FIG. 3 to two consumable 41, 42 and two and non-consumable bypass channels 43, 44. For illustration purposes, the number of the base systems is one and the base system 45 is a conventional GMAW system, although more than one and one types of base systems may also been used. Because of the use of multiple channels, the current bypassing through a particular bypass channel is reduced. If the reduction is sufficient, the undesired water cooling or shield gas cooling may be eliminated. This elimination can reduce the added size to the torch due to the addition of the bypass channels. Further, while a non-consumable bypass channel provides a mean to stabilize the bypass arcing process and control the metal transfer process and a consumable bypass channel provides a means to increase the melting speed of deposited metal, the combination of non-consumable and consumable bypass channels 41-44 provides a means to maximize the productivity with improved process and quality controllability.

For illustration purpose, one base system 45 (referred to as main system) is used; the main current 46 flowing through the wire 47 of the main system power supply (referred to as main wire) is approximately 600 A and the base metal current 48 needs to be controlled at 200 A. If a single non-consumable electrode is used to bypass 400 A, it must be water cooled and overall size of the torch set is large. Using four electrodes 41-44, each electrode only bypasses 100 A and undesired water cooling will be unnecessary. As a result, the non-consumable electrodes 43, 44 may be attached to the main system 45 with neither water cooling nor shield gas cooling. The accessories to supply such cooling will not be necessary.

Also for illustration purpose, one main system is used along with two sets of consumable and non-consumable bypass electrode groups. Each group of bypass electrodes consists of one non-consumable bypass electrode and one consumable bypass wire. The bypass wire 41 or 42 is fed into the vicinity of the non-consumable electrode 43 or 44 in its group. Because of the non-consumable characteristic, the position of the non-consumable 43, 44 is stationary. The bypass arc established between the main wire 47 and the non-consumable bypass electrode 43 or 44 is stable and stationary. Because of the presence of this stable bypass arc, the bypass wire 41 or 42 in the vicinity of the tip of the non-consumable bypass electrode 43 or 44 can easily establish its bypass arc with the main wire 47. The non-consumable bypass arc will play a stabilizer role in stabilizing the consumable bypass arc established between the main wire 47 and the bypass wire 41 or 42. Hence, while the use of consumable bypass wire 41, 42 improves the metal melting speed, the use of the non-consumable bypass electrode 43, 44 stabilizes the arcing process. Their combination provides a unique way to enhance both the productivity and the quality.

Figure 5:
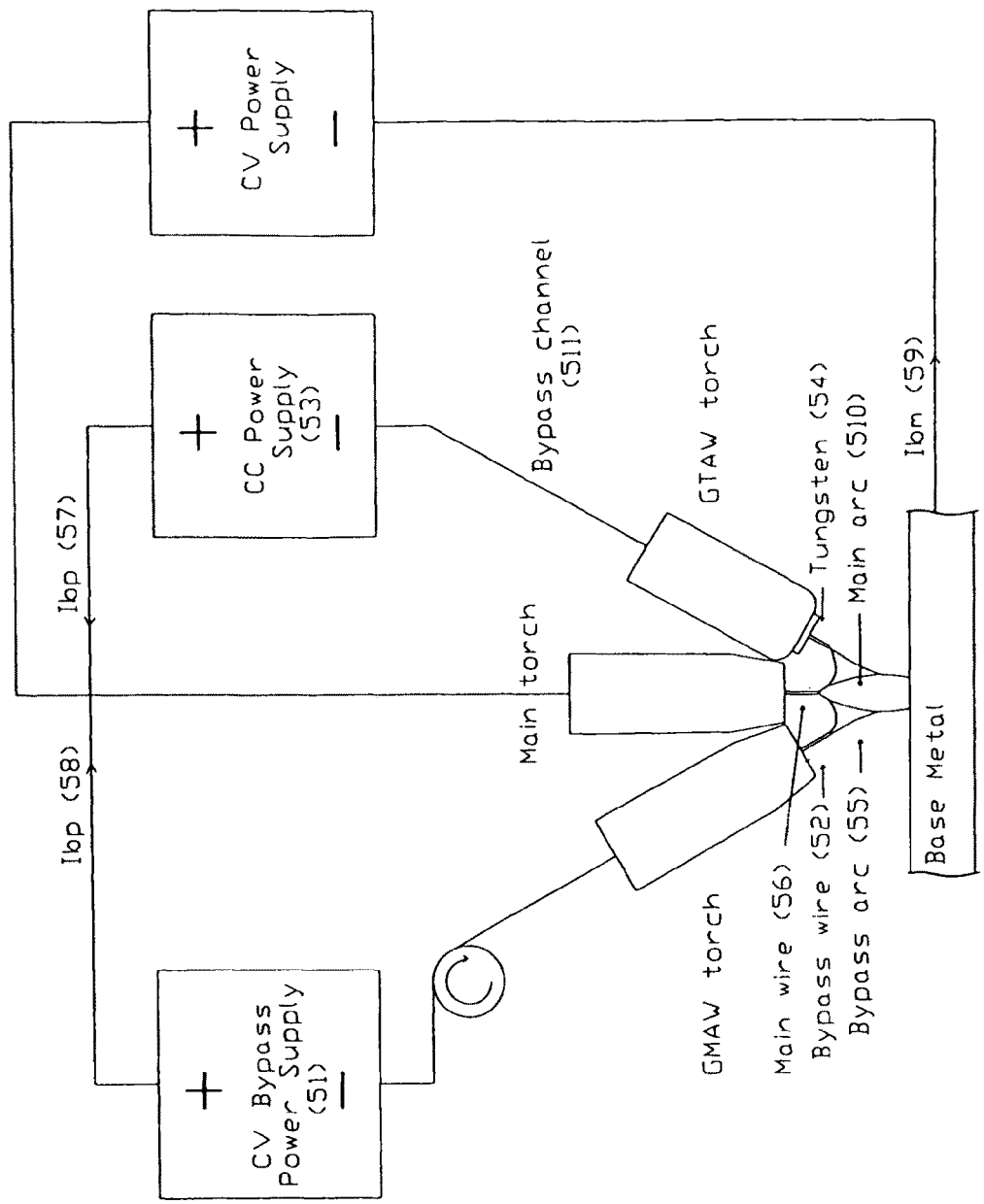
FIG. 5 is the schematic of the representation of part of an extended metal arc welding system in accordance with the principles of the present invention.

FIG. 5 discloses an embodiment for how an extended metal arc welding system with different types of bypass channels is powered although other ways may exist to power the system. In this embodiment, a CV (constant voltage) power supply 51 is used for a consumable bypass wire 52 and a CC (constant current) power supply 53 is used for a non-consumable electrode 54. The CV power supply 51 would automatically adjust its current (consumable bypass current 58) to maintain the consumable bypass arc 55 voltage or the distance between the tips of the main wire 56 and this bypass wire 52 at the pre-specified constant. In the meantime, the sum of the non-consumable bypass current 57 (current passing through the non-consumable tungsten bypass electrode 54), consumable bypass current 58, and base metal current 59 is approximately determined by the main wire feed speed and main arc 510 voltage. Because the main wire 56 feed speed and the main arc 510 voltage have been specified/given, to maintain the base metal current 59 at the desired constant, the non-consumable bypass current 57 is adjusted conveniently. The use of a CC power supply 53 for the non-consumable bypass channel 511 just made this adjustment to be done easily and conveniently. Hence, this embodiment with the particular combination of bypass power supplies further provides an easy way to (1) control the excessive heat input which is the multiplication between the base metal current 59 and the cathode arc voltage drop; (2) control the arc pressure on the weld pool surface which is proportional to the square of the base metal current 59; (3) control the speed which is the sum of the main and bypass wire feed speeds; (4) control the total heat input which is the sum of the excessive heat input and the heat contained in the deposited liquid metal; (5) control the length of the consumable bypass arc 55 which is determined by the consumable bypass arc 55 voltage.

In another embodiment where a CC power supply powered non-consumable bypass channel is absent, the voltage setting for the consumable bypass arc can be adjusted to change the bypass current. For example, when the voltage setting is increased, the CV power supply will increase the current to achieve the larger voltage. Because the length of the bypass arc is also increased, the stability of the bypass arc may be affected if the voltage setting changes from its optimal range. To use this method to adjust the bypass current, an appropriate range for this bypass voltage setting can be obtained through experiments, theoretical analysis or their combination. Or, an on-line measurement for the bypass arc stability may be formed using such as current waveforms. This measurement can be on-line calculated to determine if the bypass voltage can be further adjusted.

Figure 6:
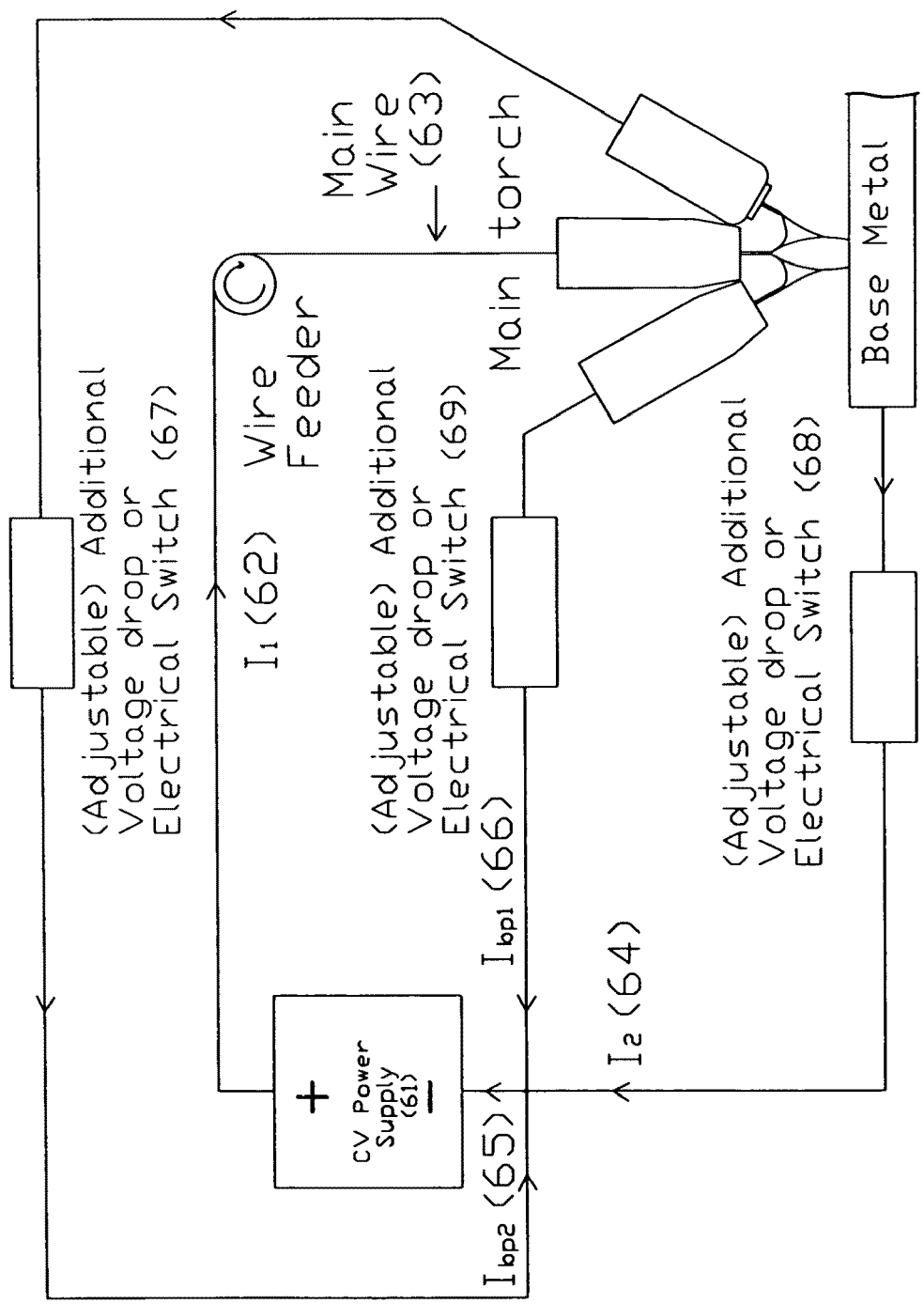
FIG. 6 is the representation of a method which uses additional voltage drops in some or all channels to adjust the current distribution when all currents are supplied by a same power supply in accordance with the principles of the present invention.

FIG. 6 discloses another embodiment for an extended metal arc welding system with different types of bypass channels being powered by only one CV power supply that has the capability to conveniently/easily control the distribution of the currents; although other ways may exist to power and control the system. To control all currents at their desired values, the main current 62 (total current) is first set at an appropriate level by adjusting the main wire 63 feed speed and the voltage setting for the CV power supply 61. Then to control the distribution of the main current 62 among the base metal current 64 and bypass currents 65, 66, some or all channels can be introduced with additional voltage drops or electronic switches 67-69 in addition to the corresponding arc voltages such that the corresponding arc voltages are reduced from the voltage setting for the CV power supply 61 as illustrated in FIG. 6.

There are different ways to introduce additional voltage drops. In one embodiment, additional voltage drops are introduced by adding diodes in series with the corresponding arc. The additional voltage drop in a channel is determined by the sum of voltage drops on each diode in series in the channel and each diode typically does not have exactly the same voltage drop with any another diode. Another method to introduce additional voltage drops is to add power resistors in appropriate channels. Another embodiment is to introduce an additional arc in the series with the bypass arc in the channel to achieve relatively large additional voltage drops. For example, if the voltage setting for the CV power supply is 35V, many diodes would have to be added into the non-consumable channel in order to avoid the majority of the current be bypassed through this channel. Instead, an additional tungsten arc can be formed between a tungsten electrode and water cooling copper block and be added into this channel in series with the bypass arc. By adjusting the distance between the tungsten and the water cooled copper, i.e., the length of the added additional arc, the additional voltage drop can be adjusted to control the bypass current through this channel. It has to be pointed out that for the additional arc, it is not established in the vicinity of the main arc with the main wire. Its effect on the accessibility of the torch set is thus non-existing. In still another embodiment, a network of the added additional tungsten arcs, power resistors, and/or diodes can be formed through parallel and/or serial connection. Electronically controllable switch devices such as IGBTs can be appropriately added in parallel with one, multiple, and/or a combination of the additional voltage drop elements to form flexible network whose effective voltage drops are electronically controllable. In still another embodiment, an electronically controllable switch device such as an IGBT is placed in series with a bypass arc. The close-open of each IGBT is controlled through a high frequency pulse width modulation (PWM) signal from a micro-processor or a circuit such that the bypass current in the channel changes at a high frequency. The effect of this high frequency change is that the effective bypass current is controlled by the duty ratio of the PWM signal.

Figure 7:
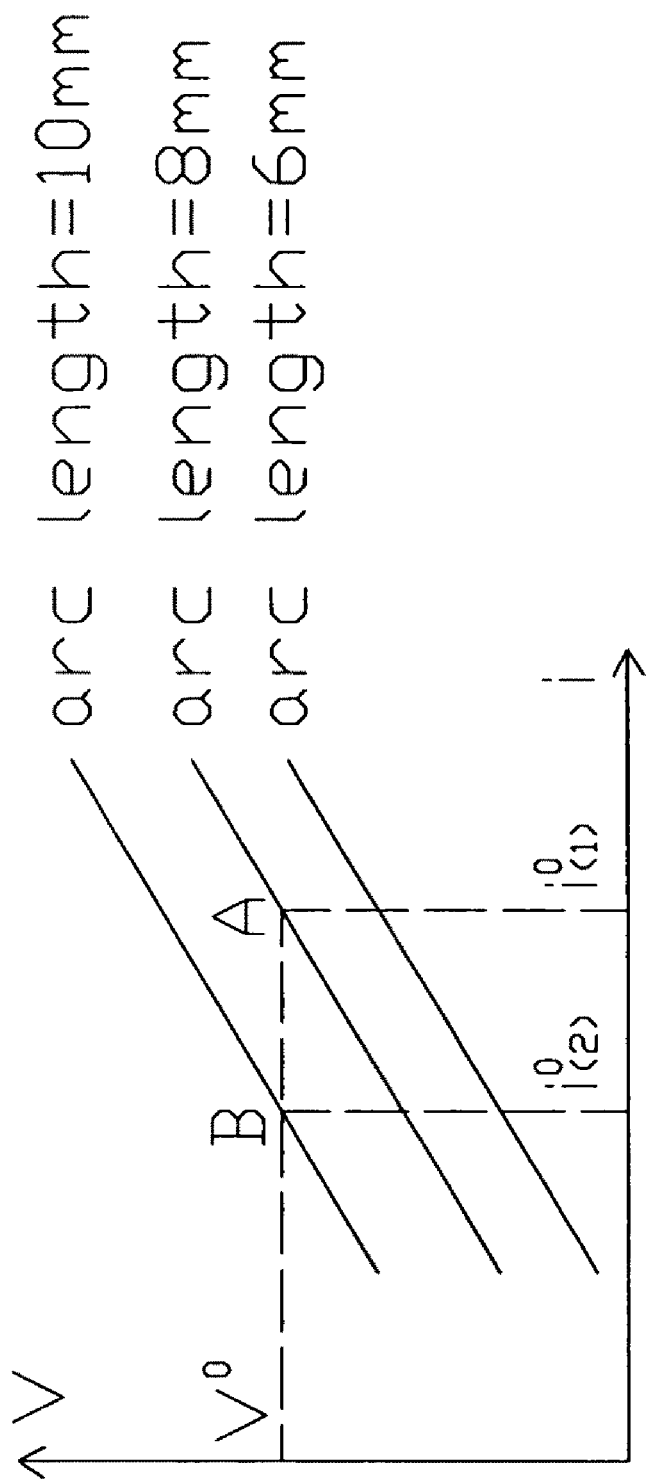
FIG. 7 is the representation of the current-voltage characteristic of an arc under different arc lengths in accordance with the principles of the present invention.

There are methods to effectively adjust the distribution among the base current and different bypass currents other than the use of additional voltage drops. In one embodiment, the demands from the bypass channels on the needed currents are changed to maintain a stable arc system which includes the main arc and bypass arcs. For the non-consumable channel, the distance between the non-consumable bypass electrode and the main wire can be adjusted in a certain range to increase/reduce the bypass current of this channel without affecting the stability of the bypass arc and the quality of the welds. For the consumable bypass channel, one effective method is to change its wire feed speed. When the bypass wire speed is reduced, the distance between the main wire and the tip of the bypass wire will tend to increase. The length of the bypass arc column will increase. Based on the current-voltage characteristics, the relationship between the current 71 and voltage 72 is approximately a set of parallel straight lines 73 with approximately the same positive slopes as illustrated in FIG. 7. When the length of the arc column increases, the governing line jumps from a lower one 74 to a higher one 75. On the other hand, the voltage between the two terminals (main wire tip and the bypass wire tip) is maintained at the given constant $V^0$ 76 through the voltage setting. Hence, the voltage before and after the jump remains unchanged. As a result, the operating position changes from A to B as illustrated in FIG. 7 and the current 71 is reduced.

The methods disclosed for using a single power supply to power an extended metal arc welding system and control the currents also work for any extended metal arc welding system (including the consumable and non-consumable DE-GMAW systems disclosed previously) which has only one bypass channel or just one type of bypass channel.

Embodiments of the present invention may comprise a composite torch housing which may be configured to substantially surround a main electrode, a first bypass electrode and a second bypass electrode. A composite torch housing may be sized so that a main electrode, first bypass electrode and second bypass electrode substantially fill the housing. For certain embodiments of the present invention, with multiple and different types of bypass channels, it is beneficial for both the consumable and non-consumable bypass electrodes to be conveniently attached to the main torch with minimized effect on the torch set. To reduce the cost, it is beneficial that an existing main system is used as the base system and additional parts are added to form an extended system. To this end, bypass electrodes also can be attached to the main torch. An issue, therefore, is how to attach bypass electrodes to the main torch conveniently and with minimal effect on the accessibility. Various methods are discussed below.

Figure 8:
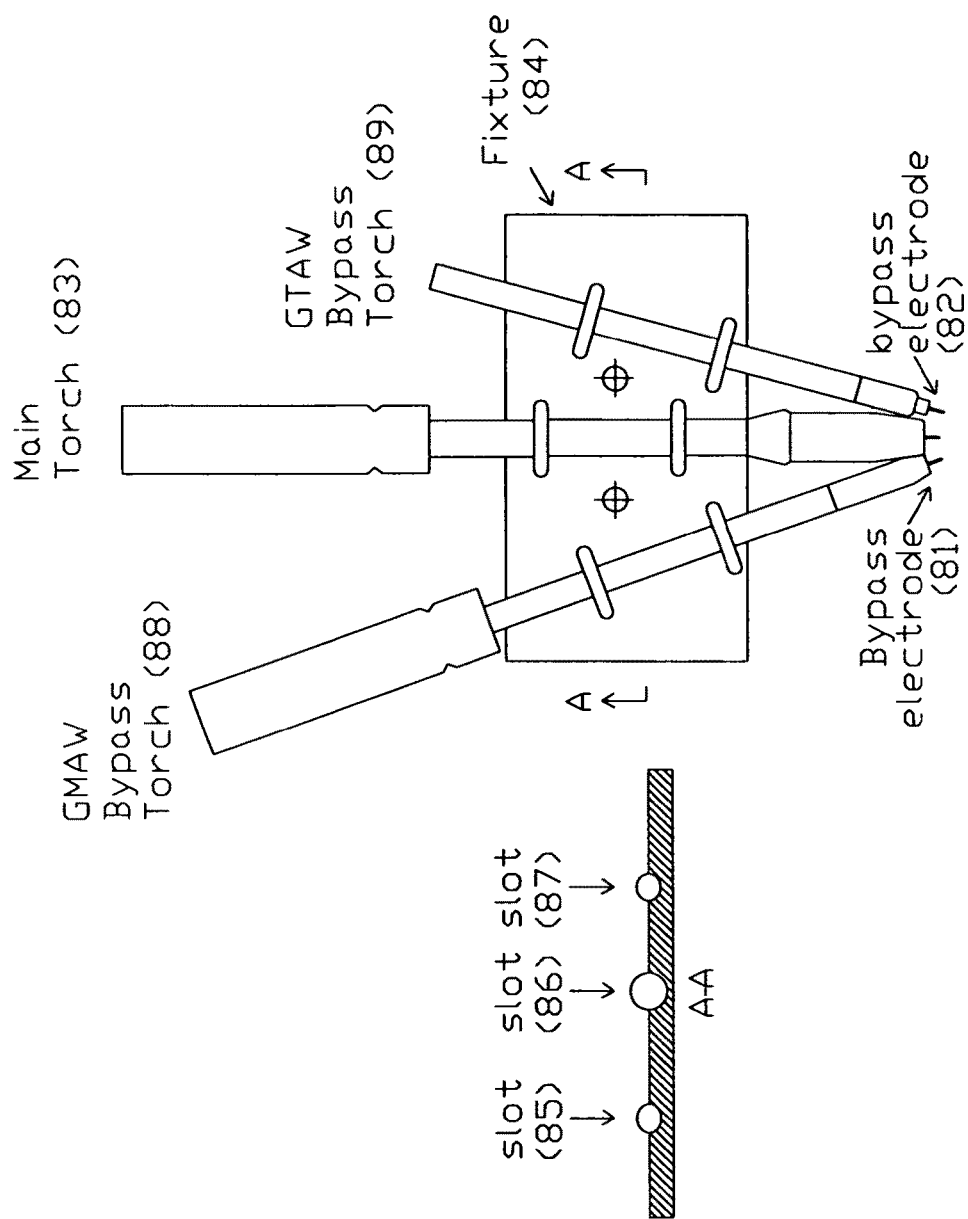
FIG. 8 is the schematic of an example design of fixture for holding add-on parts to the main torch in accordance with the principles of the present invention.

A method to attach bypass electrodes 81, 82 to the main torch 83 conveniently is disclosed first in which the fixture 84 has slots 85-87 which have substantially the same shape as the existing main torch 83 outer contour and the outer contours of the bypass electrode 81, 82 and its accessories of our selections. In one embodiment shown in FIG. 8, the bypass electrodes 81, 82 are still installed in conventional torches 88, 89. Use of substantially the same shape of the contours helps fix/attach the bypass torches 88, 89 to the main 83 firmly with the desired relative positions and angles.

Another method is also disclosed which uses curved contact tubes for consumable bypass wires and curved non-consumable electrodes with no accessories for water cooling or force air cooling. In one embodiment shown in FIG. 9, one curved contact tube 91 for consumable bypass wire 92 and one non-consumable electrode 93 are used. They are placed on the opposite sides of the nozzle of the main torch 94. However, use of one for each type of bypass channel and their locations are for illustration purpose. The method disclosed works for attaching multiple curved contact tubes for multiple consumable bypass wires and multiple curved non-consumable electrodes to the main torch. Their locations around the circumference of the main torch can be arbitrary although it is typically preferred that one curved contact tube for consumable wire and one non-consumable electrode are formed a group and arranged close with each other. Also, the number of the curved contact tubes and the number of the non-consumable electrodes may not be the same.

Elimination of the undesired water cooling and forced air cooling allows the use of the curved contact tubes for consumable wires and curved electrode to bypass currents with no accessories. Use of multiple bypass channels disclosed earlier reduces the bypass current in each channel and allowing the elimination of water cooling and forced air cooling. Use of contact tubes and non-consumable electrodes with no accessories disclosed here makes it possible to use multiple bypass channels. Hence, use of multiple bypass channels and elimination of accessories together form the extended metal arc welding system disclosed. The use of curved contact tubes and non-consumable electrodes has little affect on the accessibility of the extended metal arc welding system as compared with the original base system and the extended metal arc welding system can thus be more practical, because the curving can allow the wire and non-consumable electrode access in the vicinity of the main wire at the desired locations and angles with only minimal effect on the accessibility of the torch set, which is primarily determined by the space occupied by the end of the torch facing the work-piece.

FIG. 10 discloses a way to curve a non-consumable bypass electrode easily. This electrode has two segments: a solid copper rod 101 with an end to hold and fix a tungsten electrode, and a relatively short but straight tungsten electrode 102. Use of two segments and different materials are because (1) the solid copper rod 101 can be easily curved to provide needed geometry to minimize the effect on the torch's accessibility and needed geometry to hold the straight tungsten electrode 102 to provide the needed position and angle of the bypass electrode to the main wire 103; (2) the tungsten 102 can be used directly without water cooling to bypass moderate current (for example, up to 150 A); (3) a tungsten electrode is difficult to curve. If it can, the cost would be high or the use and supply of such special curved tungsten would be not as convenient as a straight one. Accordingly, embodiments can be easily modified by, for example, using more segments or other materials. Further, the length, the specific curvature, and diameter for each segment can vary in a relatively large range and suitable values and parameters can easily identified for a particular application following common engineering requirements.

A method to make a curved contact tube for the bypass wire is also disclosed. While other materials may also be suitable, the curved contact tube 111 for the bypass wire 112 may be made of copper. The contact tube should be relatively long, for example, but not limited to, about at least 4 inches, to allow an easy attachment to the main torch. In general, it is preferred that the outer diameter of the contact tube is small to achieve maximal torch accessibility. The inner wall of the contact wall must be smooth like a conventional contact tube in a base system to allow the wire 112 be fed smoothly. The curvature design needs to be done to allow a smooth feeding of the wire and provide the needed wire position and feeding angle while the torch accessibility is preserved or the effect on the torch accessibility is minimized. In one embodiment, a particular contact tube made by Bortech Corporation for being used in a 180 A GMAW torch without water cooling as shown in FIG. 11 is used. In this embodiment, the outer diameter of the contact tube is substantially constant along the length. However, variable outer diameter can also be used. A relatively small diameter at the end (facing the work-piece) and a relatively large diameter at another end can increase the mass of the contact tube to allow a larger bypass current without affecting the torch accessibility. In addition, the outer geometry of the contact tube may be non-round for easy attachment to the main torch.

Still other method is also disclosed to minimize the effect of attached bypass channel to the torch accessibility through "overlapping" with the main torch's nozzle.

Figure 12:
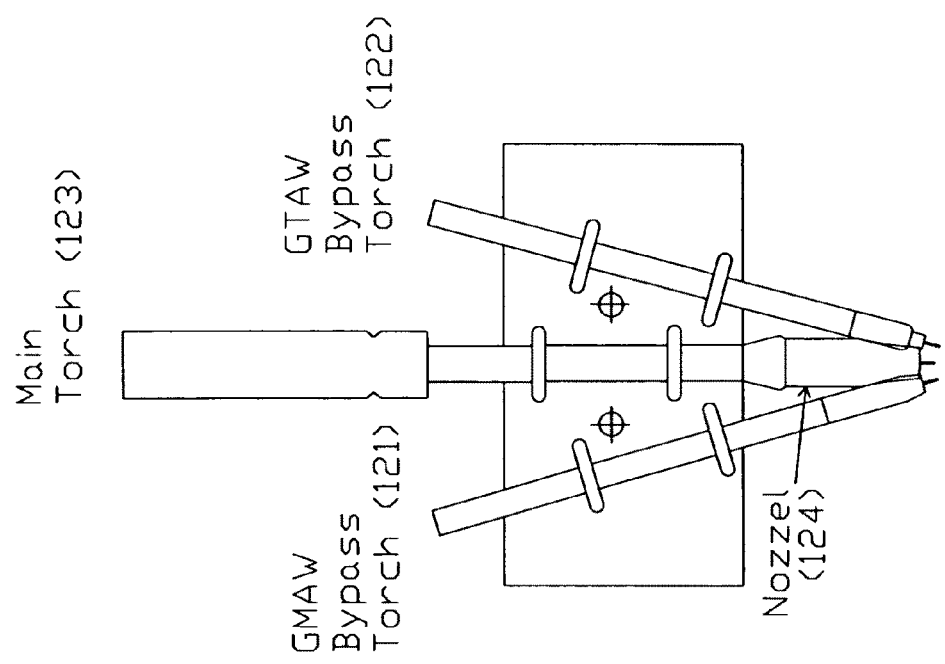
FIG. 12 is a schematic representation for reducing the overall torch size and improving the torch set accessibility through overlapping in accordance with the principles of the present invention.

In one embodiment shown in FIG. 12, bypass torches are attached to the main torch and their nozzles are removed. For illustration purpose, one consumable torch 121 and one non-consumable torch 122 are used and they are placed on the opposite sides of the main torch 123 as shown in FIG. 12 although more bypass torches can be used and be placed differently. To facilitate the overlapping, the nozzle 124 of the main GMAW torch is partially opened to accept the insertion of the bypass wire (or bypass wire contact tube) and bypass electrode (or bypass electrode contact tube). The insertion of the wire, non-contact consumable electrode and/or the contact tubes into the openings on the main torch nozzle beneficially may fill the opening as much as possible so that possible gas leakage is minimal. In addition, the openings can be made on the lower part of the main torch nozzle or be made as low as possible as long as the desired distance and angle of the bypass wire and non-consumable electrode with the main wire are achieved.

Figure 13:
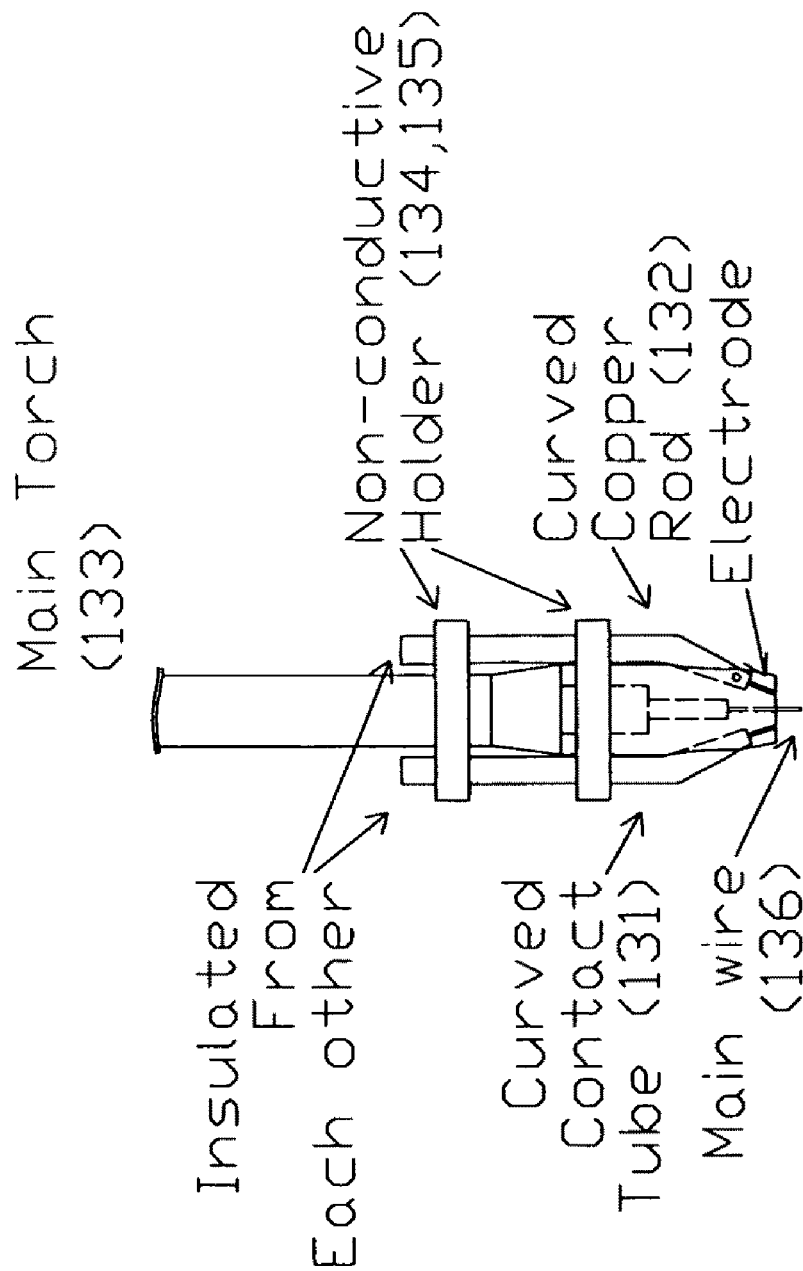
FIG. 13 is a schematic representation for overlapping contact-tubes and/or non-consumable electrodes with the main torch in accordance with the principles of the present invention.

In another embodiment shown in FIG. 13, the overlapping is used together with the curved contact tubes/electrodes without accessories to minimize the effect on the accessibility of the torch set. For illustration purposes, one contact tube 131 and one non-consumable electrode 132 are used and they are placed on the opposite sides of the main torch 133 although multiple tubes and/or multiple non-consumable electrodes can be used and be placed differently. To install the contact tube 131 and non-consumable electrode 132" on the main torch 133, two non-conductive holders 134, 135 can be used. Each holder can have an inner ring and an outer ring. The OD (outside diameter) of the inner rings and ID (inside diameter) of the outer rings are made with slots with substantially the same shapes of the contact tube 131 and non-consumable electrode 132 when the outer rings are screwed on to the inner rings. The inner rings for both holders 134, 135 can be installed onto the main torch 133 first. Then the contact tube 131 and non-consumable electrode 132" are placed on the ODs of the inner rings and aimed to insert in to the torch openings. Adjustments are made so that the contact tube 131 and electrode 132 are both placed at the positions for the desired distances and angles with the main wire 136. Then the outer rings are placed and fastened/screwed on to the inner rings. The openings on the main torch are made approximately the same size and shape of the contact tube and/or electrode to be inserted.

Figure 14:
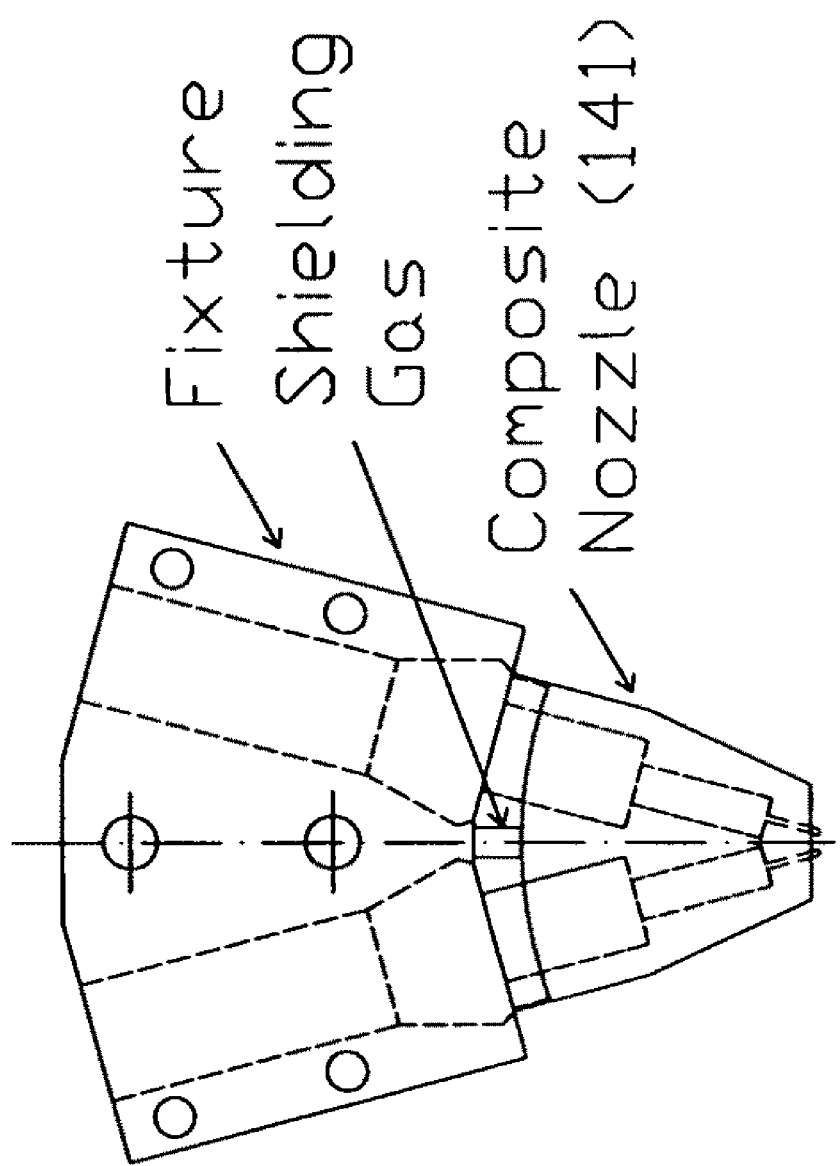
FIG. 14 is a schematic representation of a composite torch in accordance with the principles of the present invention.

In still another embodiment illustrated in FIG. 14, a composite nozzle 141 is used so that the main wire, bypass wires, and non-consumable electrodes are all shielded by the shield gas supplied into the composite nozzle. (Although only one bypass electrode/wire is explicitly shown in FIG. 14, multiple bypass electrodes/wires can be easily added into the composite torch.) As a result, not only the tips of the bypass wires and non-consumable electrodes can be shielded, their contact tubes are shielded and cooled by the shield gas. This may help improve the shield of the weld pool and help improve the stability of the arcs and facilitate an easier attachment and easier and better overlapping. In addition, the size and shape of the composite nozzle can be designed and made to provide shielding to a relatively large area on the weld pool for being suitable for application where the deposition speed of melted metal is large and the torch moves quickly. The shield gas can be supplied from the upper portion of the composite nozzle to assure the shield gas is provided everywhere without turbulence. Because of the relatively large volume of the nozzle, the flow rate can be relatively high to achieve the needed shield on the weld pool.

Figure 15:
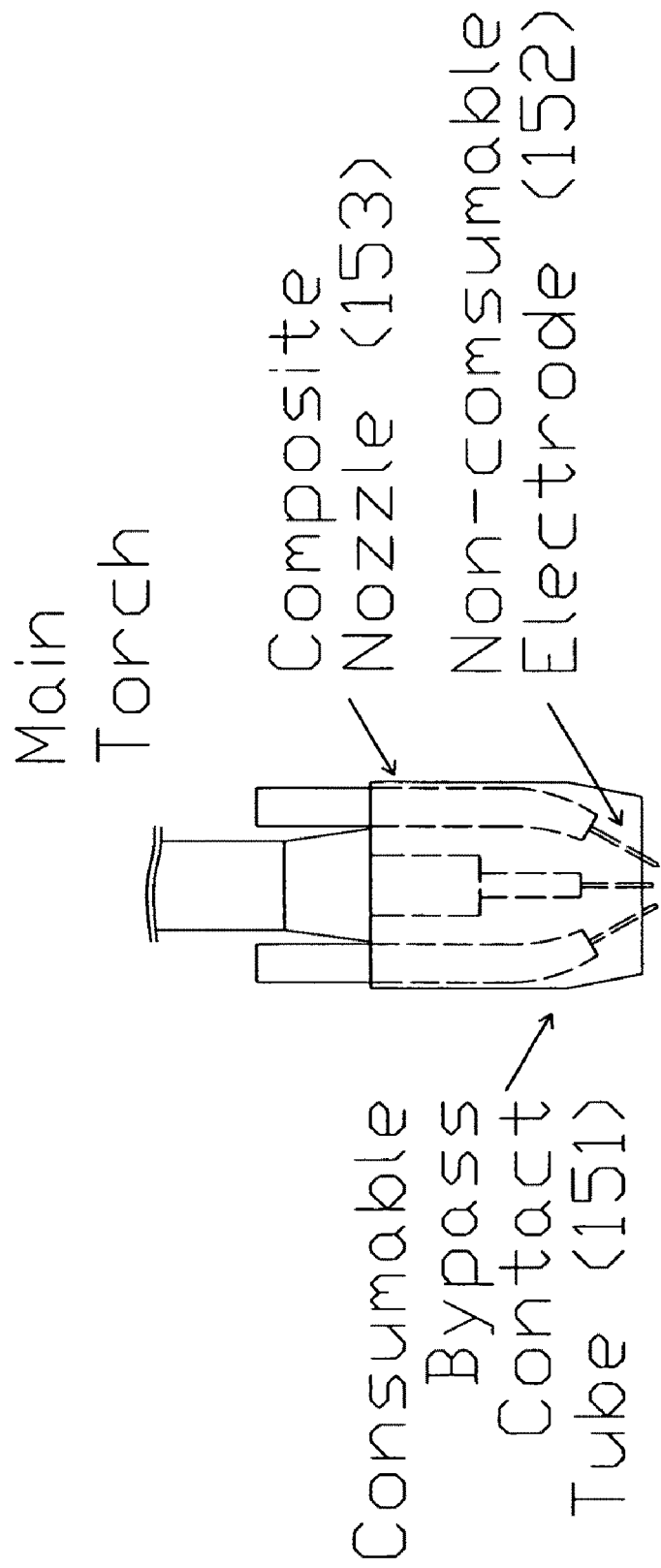
FIG. 15 is the representation of a specific design for composite torch with curved contact tubes and electrodes in accordance with the principles of the present invention.

In still another embodiment illustrated in FIG. 15, curved bypass contact tubes 151 and non-consumable electrodes 152 without accessories are inserted from upper into a composite nozzle 153. Relatively long segments of the curved bypass contact tubes 151 and non-consumable bypass electrodes 152 are shielded and cooled by the shield gas. Because of the use of curved tubes 151 and electrodes 152, the effect of added bypass channels on the accessibility can be minimized. The composite nozzle 153 can thus be made relatively compact while the whole extended bypass wires (out of the contact tubes), relatively long segments of curved bypass wire contact tubes and of non-consumable electrodes 151, 152 are still shielded and cooled.

The various described embodiments to minimize the effect on torch accessibility, work for any extended metal arc welding system (including the consumable and non-consumable DE-GMAW systems disclosed previously) which has only one bypass channel or just one type of bypass channel. In particular, bypass electrodes and channels can be added to a submerged arc welding (SAW) system and a flux cored arc welding (FCAW) system in addition to a gas metal arc welding (GMAW) system. For SAW, the bypass arc is established between the main wire and the bypass electrode (tungsten or wire) in the submerged arc welding flux without a shield gas supplied for the bypass electrode or wire. For FCAW, the bypass arc can be established between the main wire and the bypass electrode (tungsten or wire) with or without a shield gas supplied for the bypass electrode or wire; however, a shield gas is needed for the main torch.

It is also apparent some methods disclosed to minimize the effect on the torch accessibility such as those using curved contact tube and curved non-consumable bypass electrode with no accessories, no water-cooling, and no forced air cooling also may reduce the torch set to a weight which can be comfortably carried by a man. Hence, methods which enable the extended GMAW system to be manually used are also disclosed.

While the "hardware" aspects of the extended metal arc welding system have been disclosed, the aspects on how the "hardware" can be used are still to be disclosed. Thus, a description is provided below of example uses and performance of various embodiments of the contemplated extended metal arc welding system.

The unique capabilities of an extended metal arc welding system include (1) it can accurately control the excessive heat input, total heat input, total mass input, and weld geometry freely and easily; and (2) it can greatly improve the productivity (metal deposition speed) and improve weld quality at the same time. For the consumable DE-GMAW disclosed previously (US Patent Application Publication No. 20080190900), the main power is CV and the bypass power supply can be either CV or CC. When this system is used, the main wire feed speed and voltage setting are pre-specified and are constant during the welding. The main current which melts the main wire is thus approximately fixed but it is still subject to change due to the variations such as in the contact tube to work distance. Typically it is preferred that the bypass tube wire speed is fixed and is not adjusted on-line. Now the voltage of the bypass arc which measures the distance between the tip of the main wire and the tip of the bypass wire needs to be controlled as a preferred value to maintain the bypass arc stability by adjusting the bypass current. Because the total current is approximately fixed, an increase/decrease in the bypass current will decrease/increase the base metal current accordingly. Hence, the control of the base metal current is coupled with the control of the bypass arc stability. The bypass wire feed speed may be added as an additional variable to achieve a simultaneous control of the bypass arc stability and base metal current but the metal deposition speed would be changed. The excessive heat and total mass input (as well as the total heat input) are thus not controlled freely. For non-consumable DE-GMAW, the excessive heat, total heat input and total mass input can be freely control easily. However, it is less productive than a consumable DE-GMAW.

To control an extended metal arc welding system to achieve the desired objectives including (1) free and convenient control of excessive heat input, total heat input, total mass input, and weld geometry; and (2) improvement of productivity with assured weld quality, several methods can be used.

First, a method with the non-consumable bypass current as the online adjusting variable is disclosed. In one embodiment shown in FIG. 5, the main power supply, consumable bypass power supply, and non-consumable power supply are CV, CV, and CC respectively and there are only one consumable and one non-consumable bypass channel. However, this is only for illustration purpose and the numbers of the consumable and non-consumable bypass channels can both be greater than one and be different. The types of the power supplies may also differ. In this embodiment, the total mass input is first used to determine the sum of the wire feed speeds. Hence, $$W_{main} + W_{bypass1} = \text{constant 1}$$

where constant 1 is a constant determined based on the required total mass input (speed), and $W_{main}$ and $W_{bypass1}$ are the feed speeds for the main wire and bypass wire respectively. Then to determine other parameters, the following equations need to be used:

$$W_{main} = KV_{anode}I_{total}$$

$$W_{bypass1} = KV_{cathode}I_{bypass1}$$

$$H_{total} = V_{anode}I_{total} + V_{cathode}I_{bypass1} + V_{cathode}I_{BaseMetal} = \text{constant 2}$$

$$I_{BaseMetal} = I_{total} - I_{bypass1} - I_{bypass2} = \text{constant 3}$$

Where
$V_{anode}$: anode voltage drop
$V_{cathode}$: cathode voltage drop
$I_{bypass1}$: bypass current "58"
$I_{bypass2}$: bypass current "57"
$I_{BaseMetal}$: base metal current "59"
$I_{total} = I_{BaseMetal} + I_{bypass1} + I_{bypass2}$: the total current melting the main wire 56.
K: a constant coefficient
constant j (j=1, 2, 3): parameters which correspond to the needed total mass input, total heat input, and excessive heat input/arc pressure (determined by the base metal current).

The parameters to be determined include (1) $W_{main}$; (2) $W_{bypass1}$; and (3) $I_{bypass2}$. From the above equations, the following three linear equation system can be derived:

$$W_{main} + W_{bypass1} + 0I_{bypass2} = \text{constant1}$$

$$(1/K + V_\perp \text{cathode}/KV_\perp \text{anode})W_\perp \text{main} +$$
$$0W_\perp \text{bypass 1} - V_\perp \text{cathode}[I]_\perp \text{bypass2} = \text{constant 2}$$

$$\left(\frac{1}{KV_{anode}}\right)W_{main} - \left(\frac{1}{KV_{cathode}}\right)W_{bypass1} - 1\, I_{bypass2} = \text{constant3}$$

These three parameters to be determined can be solved and the main and bypass wire feed speeds can thus be determined. In the above solution, $W_{main}=KV_{anode}I_{total}$ and $W_{bypass1}=KV_{cathode}I_{bypass1}$ are approximate. When $W_{main}$ and $W_{bypass1}$ are determined and fixed, the actual $I_{total}$ and $I_{bypass1}$ may still be subject to change in order to maintain the corresponding voltage settings. Hence, while the second step in the control is to determine $W_{main}$ and $W_{bypass1}$, the third step in the control is to adjust the non-consumable bypass current $I_{bypass2}$ based on $I_{bypass2}=I_{total}-I_{bypass1}-\text{constant 3}$. Hence, a complete method and procedure to control an extended metal arc welding system to achieve the desired objectives through online adjusting the non-consumable bypass currents have been disclosed. The extension of this method and procedure to another extended metal arc welding system with different numbers of bypass channels and unequal numbers of consumable and non-consumable bypass channels can be done following the above method/procedure.

Figure 16:
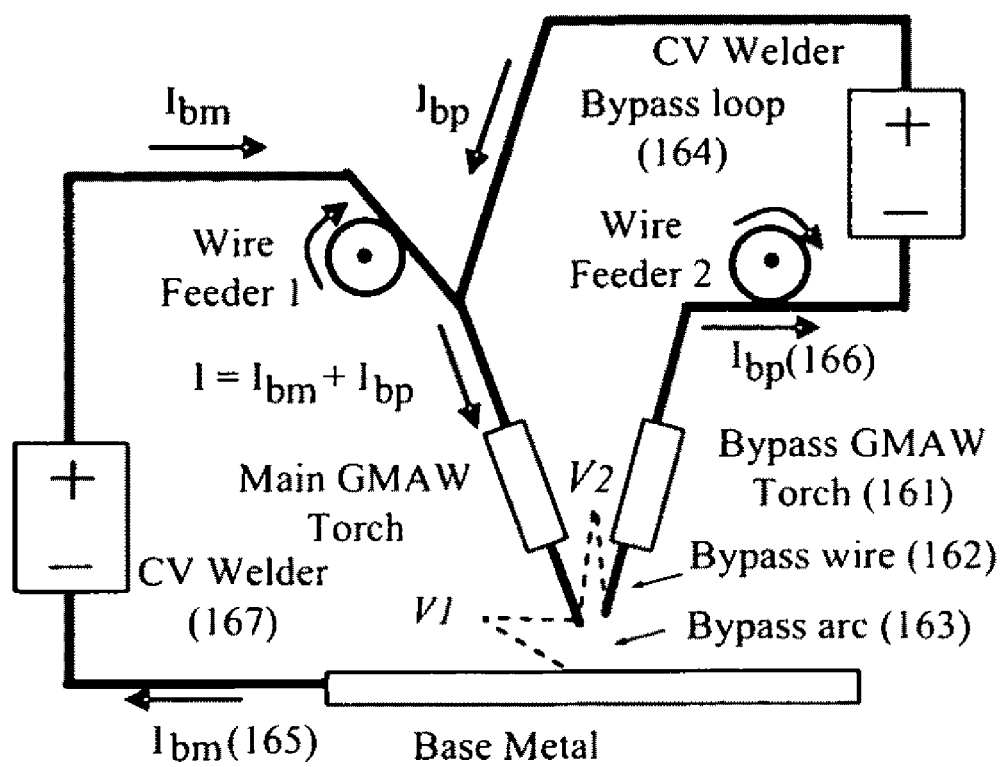
FIG. 16 represents a special realization of extended metal arc welding using two CV power supplies in accordance with the principles of the present invention.

Second, a method with parameters other than the non-consumable bypass current as the online adjusting variables is disclosed. In an embodiment shown in FIG. 16, the main power supply 167 and consumable bypass power supply 168 are both CV and there is only one consumable bypass channel. (FIG. 16 is the same as FIG. 3 except for that the bypass power supply is CC in FIG. 3.) However, this is only for illustration purpose and the numbers of the consumable bypass channels can be greater than one. The types of the power supplies may also differ. In this embodiment, the total mass input is first used to determine the sum of the wire feed speeds. Hence, $$\frac{[(W]_{main} + W_{bypass})}{v} = \text{constant 1}$$

where constant 1 is a constant determined based on the required total mass input (speed) and v is the travel speed of the torch set. Then to determine other parameters, the following equations can be used:

$$W_{main} = KV_{anode}I_{total}$$

$$W_{bypass} = KV_{cathod}I_{bypass}$$

$$H_{total} = \frac{[(V]_{anode}I_{total} + V_{cathod}I_{bypass} + V_{cathod}I_{BaseMetal})}{v} = \text{constant 2}$$

$$I_{BaseMetal} = I_{total} - I_{bypass} = \text{constant 3}$$

where $V_{anode}$, $V_{cathode}$ and $K$ are constants; constant j (j=1, 2, 3) are parameters which correspond to the needed total mass input, total heat input, and excessive heat input/arc pressure (determined by the base metal current). The parameters to be determined include (1) $W_{main}$; (2) $W_{bypass}$; (3) travel speed v. From the above equations, the following three linear equation system can be derived:

$$W_{main} + W_{bypass} - \text{constant} 1 * v = 0$$

$$(1/K + V_\downarrow \text{cathode}/KV_\downarrow \text{anode})W_\downarrow \text{main} + 0W_\downarrow \text{bypass} - \text{constant} 2 \times v = 0$$

$$\left(\frac{1}{KV_{anode}}\right)W_{main} - \left(\frac{1}{KV_{cathode}}\right)W_{bypass} - 0v = \text{constant 3}$$

These three parameters to be determined can be solved and the main and bypass wire feed speeds can thus be determined. In the above solution, $W_{main}=KV_{anode}I_{total}$ and $W_{bypass}=KV_{cathode}I_{bypass}$ are approximate. When $W_{main}$ and $W_{bypass}$ are determined and used, the actual $I_{total}$ and $I_{bypass}$ may still subject to change in order to maintain the corresponding voltage settings. As a result, the base metal current may deviate from its desired value. Hence, while the second step in the control is to determine $W_{main}$ and initial $W_{bypass}$ and initial travel speed v, the third step in the control is to on-line adjust $W_{bypass}$ and travel speed v per the following rules:

$$[(\Delta W)]_{bypass}=KV_{cathode} \qquad [(\Delta I)]_{bypass}=KV_{cathode}$$
$$(I_{BaseMetal}-\text{constant 3})$$

As a result, the new feed speed for the bypass wire can be determined. Using the new bypass wire feed speed, the travel speed can be determined based on $$\frac{[v = (W]_{main} + W_{bypass} + \Delta_{bypass})}{\text{constant}} 1$$

for an exact control of mass input, where $W_{bypass}$ is the current wire feed speed and $W_{bypass}+\Delta W_{bypass}$ is the next wire feed speed after the adjustment. Or based on $$\frac{[v - (V]_{anode}I_{total} + V_{cathod}\{[I]_{bypass} + (I_{BaseMetal} - \text{constant 3})\} + V_{cathod} * \text{Constant 3})}{(\text{Constant})} 2$$

for an accurate control of heat input, where $I_{total}$ is the total current from the measurement and is used as an estimate of the next total current (this is an accurate estimate because the main wire feed speed which determine the total current is constant), $I_{bypass}$ and $I_{BaseMetal}$ are the measurements and $I_{bypass}+(I_{BaseMetal}-\text{constant 3})$ is the estimate for the next bypass current after the adjustment on the bypass wire feed speed $W_{bypass}$, and the desired base metal current is used as an estimate of the next base metal current after the adjustment on the bypass wire feed speed $W_{bypass}$. Or based on $$\frac{[v = \gamma(W]_{main} + W_{bypass} + \Delta W_{bypass})}{\text{constant}} 1 +$$
$$\left(1 - \gamma\right)\left[\left\{I_\perp \text{total} + V_\perp \text{cathod}\left[\begin{matrix} I]_\perp \text{bypass} + \\ (I_\perp BaseMetal - \text{constant3}) \end{matrix}\right]\right.\right. +$$
$$\left.\left. V_\perp \text{cathod} * \text{Constant 3}\right]\middle/ \text{Constant 2}\right\}$$

using an appropriate weight $1>\gamma>0$ if both the mass input and heat input need to be controlled with certain accuracy. If both the mass and heat inputs need to be accurately controlled together with the base metal current, $$\frac{[v = (W)_{main} + \Delta W_{main} + W_{bypass} + \Delta W_{bypass})}{\text{constant}}1$$

$$\frac{V_{cathod}\left[\left\{\begin{array}{c}[v = (V)_{anode}I_{total} + \frac{\Delta W_{main}}{K} + \\ I]_{bypass} + \\ (I_{BaseMetal} - \text{constant 3})\end{array}\right\} + V_{cathod} * Consta\right]}{\text{Constant}}$$

a change in the main wire feed speed can be determined together with the new travel speed from the above two equations.

Third, a method to control the weld bead geometry, weld penetration depth, and base metal dilution is disclosed. The two methods discussed above can control (1) the excessive heat input and arc pressure by controlling the base metal current at a given level; (2) the mass input; and (3) the total heat input. For conventional welding applications, these controls can meet almost all major expectations/requirements. However, the extremely high productivity of an extended metal arc welding system can allow it be used in non-conventional applications. One example is for example to weld/fill ½ inch thick V-groove in a single pass with the desired heat input, mass input, weld penetration, and weld bead shape. Another example is to clad at a high speed with controlled base metal dilution. To do the latter, the weld bead are made as flat as possible and the weld penetration is minimized to just assure the fusion of the deposited liquid metal with the base metal. For those types of extremely high speed applications, the torch set needs to be weaved to control the weld bead geometry to be as flat and possible and the heat input is approximately evenly distributed in a relatively large area.

In one embodiment, a linear weaver can be used to scan the torch set transversely while it travels longitudinally. For cladding application, this type of torch set weaving is desirable because the surface being cladded is relatively flat in comparison with welding where grooves are typically present. However, this type of weaving can also be used in welding to achieve the desired weld bead with reduced base metal heat input. In another embodiment, a pendulum weaver is used to scan the torch set transversely while it travels longitudinally.

In still another embodiment, a man carries a minimized torch set with curved contact tubes and non-consumable bypass electrodes to weave the torch. The man can adjust the weaving amplitude and frequency to achieve the desired weld bead or desired cladding layer.

EXAMPLE 1

Two ½ inch thick DH-36 plates are V-grooved. The included angle is 50 degree. The two V-grooved plates are butt welded at flat position using the system shown in FIG. 16 with mixed gas 90%/10% Ar/CO2 for the main torch. The main torch's shield gas flow rate is $$15\frac{ft^3}{H}$$

and no shield gas is needed for the bypass torch. The diameter of the solid wire for both torches is 0.45 inch (1.2 mm). Using the following parameters, this butt weld can be made in a single pass with the required geometry and quality:

Voltage setting for the main and bypass CV power supplies $V_1^*$ and $V_2^*$: 37 V and 38 V respectively Wire feed speed for the main wire and bypass wire $w_1$ and wire $w_2$: 600 imp and 600 ipm respectively Travel speed v: 18 ipm Linear weaving amplitude: 5 mm Linear weaving frequency: any as the weaver permitted The measured base metal current is 150 A approximately and the bypass current is 320 A approximately.

EXAMPLE 2

Still using the system shown in FIG. 16, submerged arc welding flux can be pre-deposited at along the weld seam to perform SAW with a GMAW bypassing. A fillet joint is formed using mild steel plates both as the panel and the tee. The torches aim at the intersection of the panel and the tee (i.e., the weld seam) at 45 degree. The bypass wire can lead or trail the main wire. The diameter of both solid wires is 0.045 inch (1.2 mm). No shield gas is used for either torch. Fillet welds with required geometry can be made using different combination of welding parameters. The following are two examples of parameters that can make fillet welds with the required geometry and quality.

¼ inch panel and tee: Voltage setting for the main and bypass CV power supplies $V_1^*$ and $V_2^*$: 36 V and 35 V respectively; Wire feed speed for the main wire and bypass wire and wire $w_1$ and wire $w_2$: 450 imp and 250 ipm respectively; Travel speed v: 20 ipm ³⁄₁₆ inch panel and ¼ inch tee: Voltage setting for the main and bypass CV power supplies $V_1^*$ and $V_2^*$: 36 V and 35 V respectively; Wire feed speed for the main wire and bypass wire $w_1$ and wire $w_2$: 450 imp and 250 ipm respectively; Travel speed v: 40 ipm

EXAMPLE 3

Still using the system shown in FIG. 16, flux cored wire can be used as the main wire and/or the bypass wire to weld. While other flux cored and solid wires may be used, one can use AWS E71T-1C, 1M, 9C, 9M of 0.045" diameter flux cored wire as the bypass wire and ER70S of 0.045" diameter solid wire as the main wire. The solid main wire can lead the bypass flux cored wire. For fillet joint formed by ³⁄₁₆ inch panel and tee, the following parameters can make fillet welds with the required weld geometry and quality although other close and similar parameters may also achieve the required weld geometry and quality:

Voltage setting for the main and bypass CV power supplies $V_1^*$ and $V_2^*$: 33 V and 34 V respectively; Wire feed speed for the main wire and bypass wire $w_1$ and wire $w_2$: 700 imp and 200 ipm respectively; Travel speed v: 30 ipm; Shield gas flow rate (pure argon) for the main torch:

$$40\frac{ft^3}{H};$$

torch angle: 55° between the torch axis and the panel surface.

EXAMPLE 4

Figure 17:
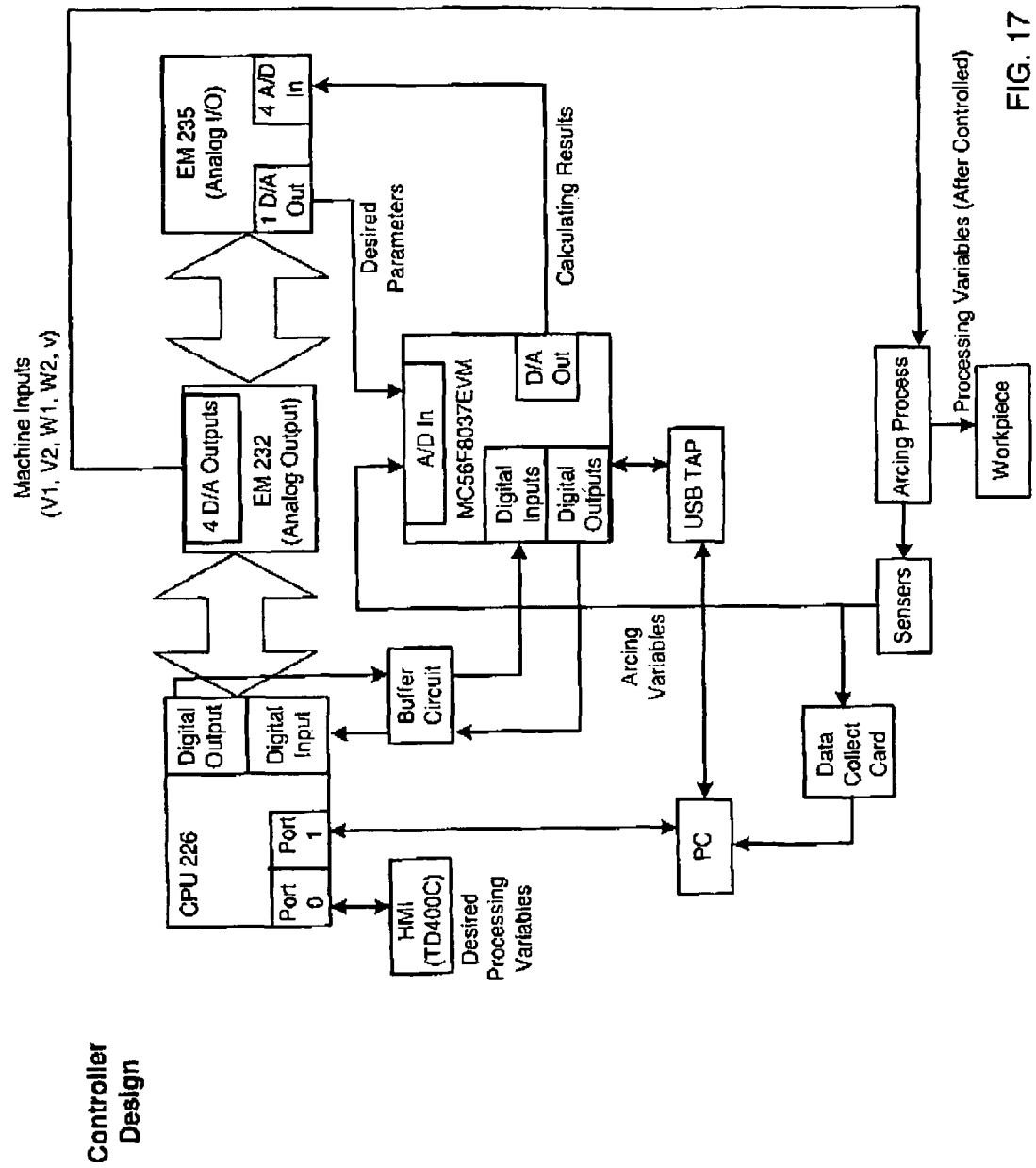
FIG. 17 represents a realization of an advanced control system in accordance with the principles of the present invention.

FIG. 17 shows a realization of an advanced control system. When using this system, it is first initialized:
1) The desired excessive and total heat inputs $y_1^*$ and $y_2^*$ are inputted as the desired processing variables by the welder through the human-machine interface (HMI) into the PLC (programmable logic controller);
2) The PLC passes these desired parameters into the DSC (digital signal controller) MC56F8037EVM, by using the "DA Out" in its "Analog I/O" module EM 235 to send the value and using PLC's digital outputs to tell the DSC which parameter being sent;
3) The DSC uses the control algorithm to determine the initial values of the machine input variables;
4) The calculating results of the machine input variables are outputted, by the DSC' single "DA Out" to output the value and by using DSC's "Digital Outputs" to specify which variable is being outputted;
5) The "Analog Output" module EM232 of the PLC outputs the machine variables, including the desired values for wire feed speeds $[((W))_1^*, W_2^*)$ and voltages for the two CV power supplies $(V_1^*, V_2^*)$, to the machines (i.e., the "Arcing Process" in FIG. 17).

However, the arcing process will not start until the welder manually presses the Run button. Once the Run button is pressed, the welding process starts:
1) The machine input variables are taken by the machines to perform the arcing process;
2) The process variables such as the currents be monitored by the sensors continuously;
3) The DSC samples the outputs from the sensors through its "AD In" and calculate the feedback of the process variables from the samples;
4) The DSC uses the process variables to calculate the actual processing variables (actual excessive heat input process and actual total heat input), i.e., the feedback of the processing variables;
5) The control algorithm in the DSC uses the feedback of the processing variables to calculate how the machine input variables should be changed;
6) The calculating result of the machine variables is sent to the PLC and the PLC sends the them to the machines in a similar way as during the initiation process;
7) The cycle repeats until the Stop button is pressed.

In a simplified realization, the mass input is not specified as an independent desired process variable and the two desired processing variables are
1) The desired excessive heat inputs $y_1^*$, and
2) The desired total heat input $y_2^*$.

As a result, the travel speed will not be treated as one of the varying machine input variables that are subject to real-time adjustment by the control algorithm. Instead, the travel speed is pre-specified and set at a constant by the welder at the motion system. The voltage settings for the two power supplies can be set at the power supplies by the welder or controlled by the PLC by switching to the Remote Control. When being controlled by the PLC, the PLC receives the values from the DSC. In the present realization of the control system, the desired voltages are constants and are inputted by the welder through the HMI and the following two variables are thus the varying machine input variables:
1) Main wire feed speed $W_1$ and
2) Bypass wire feed speed $W_2$.

The voltages settings may be adjusted, rather than the wire feed speeds, to realize the desired excessive and total heat input without changing the mass input. However, in the present realization of the advanced control system, the control algorithm uses the feedback of the processing variables $(y_1, y_2)$ to determine how to change $(W_1, W_2)$ to realize the desired processing variables inputs $(y_1^*, y_2^*)$.

In traditional welding practice, the total heat input (J/inch) is calculated as $$\frac{VI}{v}$$

where V is the welding voltage in V that consists of the resistive voltage drop in the wire extension and the arc voltage $V_a$, I is the current in A, and v is the travel speed in Inch/s. The arc voltage $V_a$ consists of (1) the anode voltage $V_{anode}$, (2) the column voltage $V_{column}$, and (3) $V_{cathode}$. However, the heat of the arc column determined by $$\frac{V_{column} I}{v}$$

does not, at least not directly, enter the work-piece. The total heat input is actually smaller than $$\frac{VI}{v}$$

and the heat input efficiency η ($0<\eta<1$) has been used in welding research community such that the actual total heat input is $$\frac{\eta VI}{v}.$$

However, use of the heat input efficiency is not an accurate and scientific way to determine the heat input because the heat input efficiency changes with the arc length.

In this invention, in order to simplify the analysis, $$\frac{[(V]_{anode} + V_{cathode})I}{v}$$

is used as the estimate of the heat input into the work-piece by omitting the radiation of the heat from the arc column into the wire and work-piece and the resistive heat. However, either $V_{anode}$ nor $V_{cathode}$ is directly measurable. Fortunately, we may estimate the sum of them based on $V_a[(V)]_0 + k_1 I) + (k_2 l + k_3 l I) = (V_{cathode} + V_{anode}) + (k_2 + k_3 I) l$ where l is the arc length. The coefficients in this model can be easily identified from experimental data. Once the model is available, their sum $V_{cathode} + V_{anode} = V_0 + k_1 I$ can be calculated using l=0. Then the estimate of the heat input $$\frac{[(V]_{anode} + V_{cathode})I}{v}$$

can be calculated.

While $$\frac{[(V)_{anode} + V_{cathode}]I}{v}$$

is the estimate of the total heat input into the work-piece, it can be seen that (1)

$$\frac{V_{anode}I}{v}$$

is the heat that directly heats and melts the wire but it inputs into the work-piece through the droplets; (2)

$$\frac{V_{cathode}I}{v}$$

is the heat that directly heats the work-piece. For GMAW or its variants SAW and FCAW, wire is melted. From this point of view, we have referred to the heat that melts the wire as the Effective Heat and the heat that does not directly melt the wire but directly heats the work-piece as Excessive Heat. The sum of the effective heat $$\frac{V_{anode}I}{v}$$

and excessive heat $$\frac{V_{cathode}I}{v}$$

is the estimate of the total heat by omitting the arc column heat. Hence, in conventional GMAW, SAW, and FCAW without bypass channel, 1) Excessive Heat Input $y_1 = \frac{V_{cathode}I}{v}$ 2) Total Heat Input $y_2 = \frac{y_2 + V_{anode}I}{v} = \frac{[(V)_{anode} + V_{cathode}]I}{v}$ The effective heat and excessive heat may affect the distortion differently. The excessive heat that directly heats the work-piece may contribute to the distortion more effectively than that the effective heat that enters the work-piece through metal deposition.

With a bypass channel, the current is broken into two branches such that $$I=I_1+I_2$$

where $I_1$ is the base metal current and $I_2$ is the bypass current. As a result, in bypass processes, 1) Excessive Heat Input $y_1 = \frac{V_{cathode}I_1}{v}$ 2) Total Heat Input $y_2 = \frac{[(V)_{anode} + V_{cathode}]I}{v}$ When an application is given, the welding parameters are determined/optimized to meet certain performance goals. In this realization/example, the excessive heat input and total heat input serve as a guideline to help us to optimize/determine the welding parameters in correct directions: i.e., whether to increase or decrease the excessive heat input and/or the total heat input. For example, if the penetration is larger than needed, then the excessive heat input may be reduced. This would imply a decrease in $I_1$ because the travel speed $v$ is constant in the present realization. If the total heat input is to remain at the same level, the bypass $I_2$ will be increased accordingly such that the total current reminds unchanged. After the appropriate penetration is achieved, the mass input can be examined. If the mass input is larger than desired, reduce the total current can be reduced by reducing the bypass current while still maintaining the base metal current (thus the penetration capability) unchanged. In this way, the desired mass input and penetration can be achieved and the needed total and excessive heat input are determined to achieve these desired results.

During the implementation phase, the desired excessive heat input and total heat input are known and they will dictate the weld penetration and distortion. However, to maintain these two parameters, the wire feed speeds will subject to change so that the mass input may change from the desired level. Fortunately, the adjustment of the wire feed speeds will be in small ranges such that the mass input is still in the range (the requirement on the mass input is not very accurate).

In the above process, if the cathode voltage and anode voltage are constant, it is unnecessary to know their exact values in order to implement the advanced control system to achieve the desired results mentioned above. Further, even though they may increase with the current, the desired results mentioned above can still be achieved. This is possible because (1) the nominal values calculated and used map one-to-one to their corresponding actual values and (2) the nominal values increase proportionally with their corresponding actual values. As a result, the nominal heat inputs are used hereafter in the advanced system.

In the present realization, the travel speed $v$ is a constant and the cathode and anode voltages ($V_{cathode}$ and $V_{anode}$) are considered constant. Hence,
1) Excessive Heat Input $y_1=\lambda_1 I_1$
2) Total Heat Input $y_2=\lambda_2 I$
where $$\lambda_1 = \frac{V_{cathode}}{v} \text{ and } \frac{[\lambda_2 = (V)_{anode} + V_{cathode}]}{v}.$$

Hence, if the heat inputs deviate from their desired values, the corresponding currents need to be adjusted. For the main wire, it is melted by the total current I. The main supply is set at CV mode and the current increases as the main wire feed speed increases, wire extension reduces, and voltage setting increases. Hence, $$I=f(W_1, V_1^*, L_1)$$

However, when the voltage setting and wire extension are not adjusted intentionally, they are considered constants so that we can focus on the following primary relationship:

$$I=f(W_1)$$

Similarly, $$I_2=g(W_2)$$

If those two relationships are available, the following control criteria can be used to determine the adjustment $\Delta W_1$ and $\Delta W_2$:

$$[(y_2)]^* = y_2 + \lambda_2 \Delta I = y_1 + \lambda_2(f(W_1 + \Delta W_1) - f(W_1))$$

$$y_1^* = y_1 + \lambda_1(\{f(W_1 + \Delta W_1) - g(W_2 + W_2)\} - \{f(W_1) - g(W_2)\})$$

Experimental data shows that the following linear models have sufficient accuracy:

$$I = 0.7662 W_1 + 121.7525$$

$$I_2 = 0.7120 W_2 - 16.24$$

From the above models, $$y_2^* - y_2 = \lambda_2 0.7562 \Delta W_1$$

$$y_1^* - y_1 = \lambda_1 (0.7662 \Delta W_1 - 0.7120 \Delta W_2)$$

Hence, $$\left[\frac{[\Delta W_1 = ((y)_2)^* - y_2)]}{\lambda_2}\right] = 1.305 \left[\frac{[(y)_2]^* - y_2)}{\lambda_2}\right]$$

To be robust, when the control speed is not required to be absolutely as high as possible, the adjustment speed can be appropriately reduced by using an adjustment ratio $m_1$ ($0 < m_1 < 1$) such that $$\Delta W_1 = m_1 \times 1.305 \left[\frac{[(y)_2]^* - y_2)}{\lambda_2}\right]$$

For $\Delta W_2$, $$\frac{[(y)_1^* - y_1)}{\lambda_1} = 0.7662 \Delta W_1 - 0.7120 \Delta W_2$$

$$= 0.7662 \times 1.305 \left[\frac{[m_1\{(y)_2\}^* - y_2)}{\lambda_2}\right] - 0.7120 \Delta W_2$$

Hence, $$0.7120 \Delta W_2 = 0.7662 \times 1.305 m_1 \left[\frac{[(y)_2]^* - y_2)}{\lambda_2}\right] - \frac{[(y)_1^* - y_1)}{\lambda_1}$$

As a result, $$\Delta W_2 = 1.404 m_1 \left[\frac{[(y)_2]^* - y_2)}{\lambda_2}\right] - \frac{1.404[(y)_1^* - y_1)}{\lambda_1}$$

Again, to be robust, we can slow the adjustment speed by introducing an adjustment ratio $m_2$ ($0 < m_2 < 1$):

$$\Delta W_2 = 1.404 m_2 \left\{ m_1 \left[\frac{[(y)_2]^* - y_2)}{\lambda_2}\right] - \frac{[(y)_1^* - y_1)}{\lambda_1} \right\}$$

The feedback control algorithm is thus $$\Delta W_1 = 1.305 m_1 \left[\frac{[(y)_2]^* - y_2)}{\lambda_2}\right]$$

$$\Delta W_2 = 1.404 m_2 \left\{ m_1 \left[\frac{[(y)_2]^* - y_2)}{\lambda_2}\right] - \frac{[(y)_1^* - y_1)}{\lambda_1} \right\}$$

Because the currents are monitored, we can convert the heat inputs into terms of currents:

$$\Delta W_1 = 1.305 m_1 \{I^* - I\}$$

$$\Delta W_2 = 1.404 m_2 \{m_1(I^* - I) - [(I)]_1^* - I_1)\}$$

where $I^*$ and $I_1^*$ are the desired total and base metal current that can produce the desired total and excessive heat inputs.

A simple version of the control algorithm can be $$\Delta W_1 = 1.305 m_1 \{I^* - I\}$$

$$\Delta W_2 - 1.404 m_2 \{(I^* - I) - [(I)]_1^* - I)\} = 1.404 m_2 [(I)]_2^* - I_2)$$

where $I_2^* = I^* - I_1^*$ can be considered the desired bypass current that can assure the base metal current equals its desired value if the total current is at the desired level.

EXAMPLE 5

Figure 18:
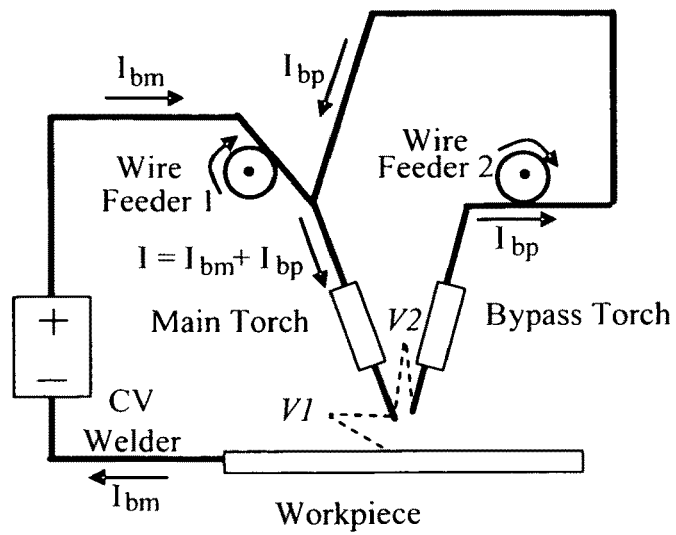
FIG. 18 is an example to use a single power supply and an added consumable electrode/torch to bypass current and control the total current and base metal current by adjusting the main and bypass wire feed speeds in accordance with the principles of the present invention.

FIG. 18 is an example to use a single power supply and an added consumable electrode/torch to bypass current from GMAW, SAW and FCAW and control the total current and base metal current by adjusting the main and bypass wire feed speeds. When the main wire and bypass wire are both ER70S of 0.045 inch (1.2 mm) diameter, we can use the following parameters to achieve the following currents:

Voltage setting for the CV power supply V*: 36 V; Wire feed speed for the main wire and bypass wire $w_1$ and wire $w_2$: 450 imp and 200 ipm respectively; Travel speed v: 20 ipm; main torch shield gas (argon): $40_H^{ft^3}$. Total current 380 A approximately; bypass current 120 A (base metal current 160 A) approximately.

Voltage setting for the CV power supply V*: 36 V; Wire feed speed for the main wire and bypass wire $w_1$ and wire $w_2$: 450 imp and 300 ipm respectively; Travel speed v: 20 ipm; main torch shield gas (argon):

$$40 \frac{ft^3}{H}.$$

Total current 380 A approximately; bypass current 160 A (base metal current 120 A) approximately.

EXAMPLE 6

Figure 19:
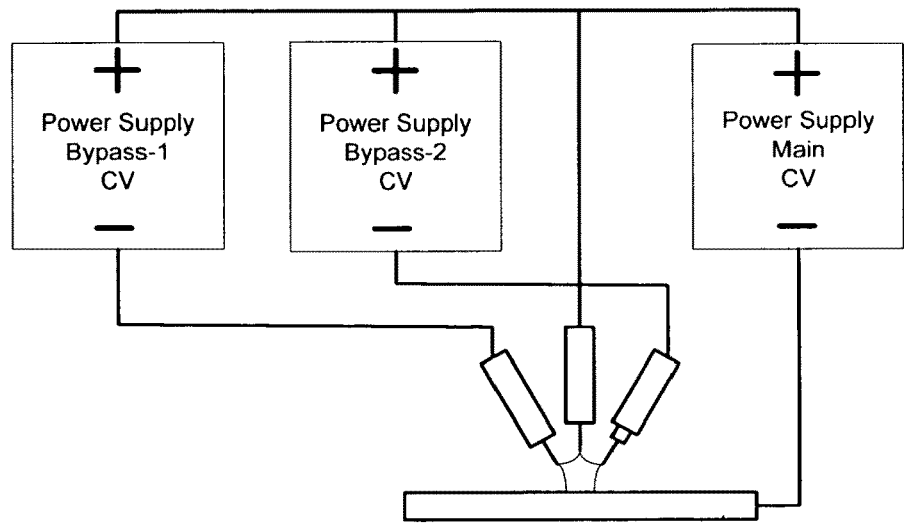
FIG. 19 is an example for a system with multiple bypass channels in accordance with the principles of the present invention.

FIG. 19 is an example for multiple bypass channels. In this example, bypass channel 1 powered by CV "power supply bypass-1" uses a consumable wire and bypass channel 2 powered by CC "power supply bypass-2" uses a non-consumable tungsten electrode.

The bypass torches are not supplied with shield gases. The main torch is supplied with pure argon. The CC power supply is set at the desired current and bypass arc 2 is automatically established after the main arc is established. The start of the bypass wire feeder is controlled by a manual switch.

Figure 20:
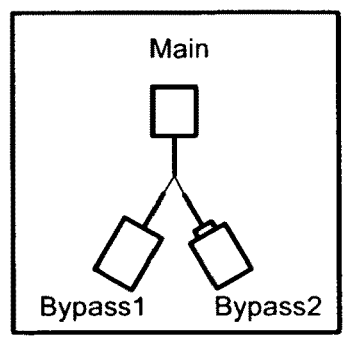
FIG. 20 is an example for arrangement of consumable bypass wire and non-consumable bypass tungsten electrode for a system with multiple bypass channels in accordance with the principles of the present invention.

The tips of three electrodes can form a V-shape as shown in FIG. 20. In this V-shape, it is likely that the bypass wire would only be melted by bypass arc 1 established between the main wire and bypass wire although it would also be indirectly heated by the radiation of bypass arc 2 established between the main wire and the tungsten. When the main and bypass wires are ER70S of diameter 0.045 inch (1.2 mm), using the following parameters, the process is stable:

Voltage setting for the main and bypass CV power supplies $V_1^*$ and $V_2^*$: 35 V and 38 V respectively; Wire feed speed for the main wire and bypass wire $w_1$ and wire $w_2$: 500 imp and 310 ipm respectively; Bypass current setting for CC power supply: 100 A; shield gas (pure argon):

$$60\frac{ft^3}{H},$$

The resultant base metal current, bypass current 1 and bypass current 2 are 158 A, 154 A, and 100 A approximately.

Figure 21:
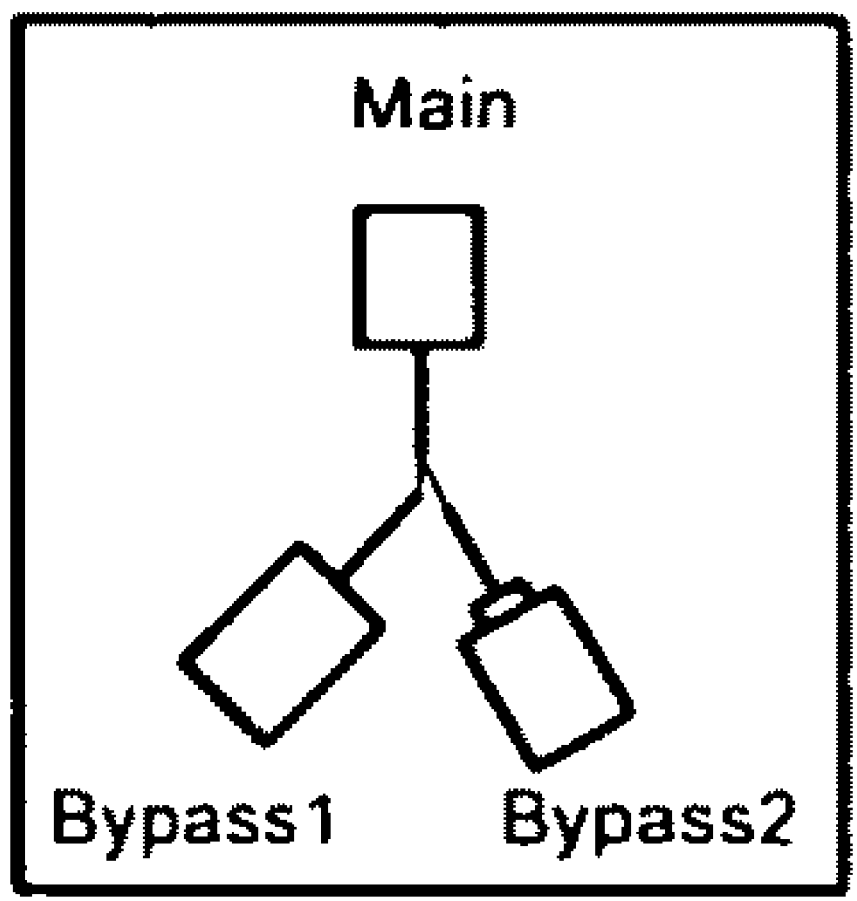
FIG. 21 is another example for arrangement of consumable bypass wire and non-consumable bypass tungsten electrode for a system with multiple bypass channels in accordance with the principles of the present invention.

The tips of the electrodes may also be arranged into the y-shape as shown in FIG. 21. In this realization/example, the bypass wire aims at the middle of bypass arc 2 that is established from the tip of the main wire to the tungsten. In this type of torch arrangement, it is likely that the main wire tends to have one anode that collects all the electrons from both bypass electrodes. (In V-shape, the main wire may tend to have two separate anode areas—although they may not separately distribute and may overlap, but the overlapping should not be complete—to collect electrons from the corresponding bypass electrode.) Hence, the bypass wire may immerse in and be directly heated by bypass arc 2 while it is mainly heated by bypass arc 1.

When the main and bypass wires are ER70S of diameter 0.045 inch (1.2 mm), using the following parameters, the process is stable:

Voltage setting for the main and bypass CV power supplies $V_1^*$ and $V_2^*$: 35 V and 38 V respectively; Wire feed speed for the main wire and bypass wire $w_1$ and wire $w_2$: 500 imp and 310 ipm respectively; Bypass current setting for CC power supply: 100 A; shield gas (pure argon):

$$60\frac{ft^3}{H},$$

The resultant base metal current, bypass current 1 and bypass current 2 are 138 A, 160 A, and 100 A approximately.

Embodiments of the present invention have been described herein with specific examples. However, one of ordinary skill will recognize that other variations may be practiced without departing from the scope of the present invention. For example, the number of bypass electrodes can vary such that two, three, or even more bypass electrodes can be present, whether consumable or not. Additionally, more than one main electrode or main torch can be utilized. In such an arrangement, each main torch can have its own set of bypass electrodes.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with each claim's language, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A welding system comprising:
   a main torch including a main electrode configured to form a first arc with a base metal;
   a first bypass torch including a first bypass electrode configured to form a second arc with the main electrode; and
   a second bypass torch including a second bypass electrode configured to form a third arc with the main electrode.

2. The welding system of claim 1, wherein the main torch is a gas metal arc welding torch.

3. The welding system of claim 1, wherein the main torch is a flux cored arc welding torch.

4. The welding system of claim 1, wherein the main torch is a submerged arc welding torch.

5. The welding system of claim 1, wherein the first bypass electrode is a consumable type electrode.

6. The welding system of claim 1, wherein the first bypass electrode is a non-consumable type electrode.

7. The welding system of claim 1, wherein each torch includes a separate power supply.

8. The welding system of claim 1, wherein the first bypass torch includes a third bypass electrode.

9. The welding system of claim 8, wherein each of the first bypass electrode and the third bypass electrode are a consumable type electrode.

10. The welding system of claim 8, wherein each of the first bypass electrode and the third bypass electrode are a non-consumable type electrode.

11. The welding system of claim 8, wherein the first bypass electrode is a consumable type electrode and the third bypass electrode is a non-consumable type electrode.

12. The welding system of claim 8, wherein the second bypass torch includes a fourth bypass electrode.

13. The welding system of claim 1, further comprising:
    a constant voltage power supply configured to provide respective currents to each torch.

14. The welding system of claim 13, further comprising:
    one or more voltage drops respectively applied to each torch so as to control respective arc voltages of one or more of the first, second, and third arcs.

15. The welding system of claim 14, wherein at least one of the voltage drops includes a diode in series with a respective one of the first, second, and third arcs.

16. The welding system of claim 1 further comprising:
a switch in series with the first bypass electrode, the switch having a first position and a second position, wherein when in the first position the second arc is generated and in the second position the second arc is not generated.

17. The welding system of claim 16, wherein the switch includes an insulated-gate bipolar transistor.

18. The welding system of claim 17, further comprising:
a signal generator configured to produce a pulse width modulated signal for controlling the switch.

19. The welding system of claim 1, further comprising:
a fixture having a respective slot for holding the main torch, the first bypass torch, and the second bypass torch.

20. The welding system of claim 1, wherein:
the first bypass torch is shaped to match an outside contour of a first portion of the main torch; and
the second bypass torch is shaped to match an outside contour of a second portion of the main torch.

21. The welding system of claim 20, wherein the first and second bypass torch are located on opposite sides of the main torch.

22. A welding system comprising:
a main torch including a main electrode configured to form a first arc with a base metal;
a first bypass torch including a first bypass electrode configured to form a second arc with the main electrode; and
a contact tube configured to feed consumable wire to form a third arc with the main electrode.

23. The welding system of claim 22, wherein the contact tube is curved to complement an outside contour of the main torch.

24. The welding system of claim 22, wherein the first bypass electrode is a non-consumable type electrode.

25. The welding system of claim 24, wherein the first bypass electrode comprises:
a first portion comprising copper;
a tungsten electrode held in place by the first portion.

26. The welding system of claim 25, wherein the first portion is configurably shaped so as to position the tungsten electrode at a desired position relative to the main electrode.

27. A welding system comprising:
a main torch including a main electrode configured to form a first arc with a base metal;
a first bypass torch including a first bypass electrode configured to form a second arc with the main electrode;
a second bypass electrode configured to form a third arc with the main electrode; and
a composite torch housing configured to at least mostly surround the main electrode, the first bypass electrode and the second bypass electrode.

28. The welding system of claim 27, wherein the second bypass electrode is part of a second bypass torch.

29. The welding system of claim 27, wherein the second bypass electrode is part of a contact tube configured to feed consumable wire.

30. The welding system of claim 27, wherein the composite torch housing is sized so that the main electrode, first bypass electrode and second bypass electrode substantially fill the housing.

* * * * *

UNITED STATES PATENT AND TRADEMARK OFFICE
CERTIFICATE OF CORRECTION

| | | |
|---|---|---|
| PATENT NO. | : 8,278,587 B2 | Page 1 of 1 |
| APPLICATION NO. | : 12/661433 | |
| DATED | : October 2, 2012 | |
| INVENTOR(S) | : Yu Ming Zhang and Jinsong Chen | |

It is certified that error appears in the above-identified patent and that said Letters Patent is hereby corrected as shown below:

Under "Related U.S. Application Data" on the cover page of the patent document, the following should be further listed as a priority patent application:

(60) Provisional application No. 61/260,382, filed on Nov. 11, 2009.

Signed and Sealed this
Thirteenth Day of November, 2012

David J. Kappos
*Director of the United States Patent and Trademark Office*